(12) United States Patent
Ibaraki et al.

(10) Patent No.: US 7,436,541 B2
(45) Date of Patent: Oct. 14, 2008

(54) INFORMATION PROCESSING APPARATUS WITH AN ADDITIONAL FUNCTION UNIT

(75) Inventors: Shouichi Ibaraki, Tokyo (JP); Masayuki Takayama, Kashiwa (JP); Aruna Rohra Suda, Yokohama (JP); Masanori Wakai, Tokyo (JP); Kenichi Fujii, Yokohama (JP); Satomi Takahashi, Yokohama (JP); Suresh Jeyachandran, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 713 days.

(21) Appl. No.: 10/818,857

(22) Filed: Apr. 5, 2004

(65) Prior Publication Data

US 2004/0233468 A1    Nov. 25, 2004

Related U.S. Application Data

(63) Continuation of application No. 09/178,751, filed on Oct. 27, 1998, now abandoned.

(30) Foreign Application Priority Data

| Oct. 27, 1997 | (JP) | ................................... 9-294203 |
| Oct. 27, 1997 | (JP) | ................................... 9-294204 |
| Oct. 27, 1997 | (JP) | ................................... 9-294261 |
| Oct. 27, 1997 | (JP) | ................................... 9-294262 |
| Oct. 27, 1997 | (JP) | ................................... 9-294267 |

(51) Int. Cl.
*G06K 15/00* (2006.01)
*B65H 3/00* (2006.01)

(52) U.S. Cl. ........................................ 358/1.6; 271/18

(58) Field of Classification Search ................ 358/1.15, 358/400, 404, 444, 474, 475, 406, 401, 1.14, 358/1.1, 1.13; 340/5.5; 235/15; 271/8.1, 271/278, 3.17, 4.04, 18

See application file for complete search history.

(56) References Cited

U.S. PATENT DOCUMENTS 3,985,326 A * 10/1976 Kittstein .................. 248/218.4
4,165,682 A *  8/1979 Weiss ........................... 99/331

(Continued)

FOREIGN PATENT DOCUMENTS

| FR | 2568281 | * 5/1986 |
| WO | 95/19030 | 7/1995 |
| WO | WO 95/19030 | 7/1995 |

OTHER PUBLICATIONS

European Office Action dated Dec. 28, 2007 in corresponding European Application No. 98 308 719.8-1248.

*Primary Examiner*—Jerome Grant, II
(74) *Attorney, Agent, or Firm*—Fitzpatrick, Cella, Harper & Scinto

(57) ABSTRACT

A control box is provided for a printer to enable additional information processing, such as transmission of a job and transmission of notifications. The control box is fixed to a plate member that is sandwiched between the printer and a pedestal, so that it can be secured to the printer without drastically altering the printer itself. As another method, wheels are provided for the plate member on which is mounted the control box. The control box is normally placed beside the main body of the printer, and when it can be moved as needed, a door or a tray provided on the side of the main body can be used. An operating panel that is used to enter an instruction for the control box is fixed to one end of a flexible strut that is secured at the other end. With this arrangement, pressure applied by a user can be dispersed. Furthermore, the operating panel is inclined so that it can be pivoted, and the fixed portion of the strut is so designed that it is destroyed by the application of excessive force, and in this manner prevents the destruction of the entire panel and the upsetting of the apparatus itself. In addition, the control box and the operating panel are connected by a multi-cable that is constituted by a plurality of individually shielded associated signal lines that are also collectively shielded. The multi-cable is passed through the strut.

36 Claims, 37 Drawing Sheets

U.S. PATENT DOCUMENTS

| | | | |
|---|---|---|---|
| 4,612,656 A | 9/1986 | Suzuki et al. | 377/24 |
| 5,283,595 A | 2/1994 | Krukovsky | 345/2 |
| 5,488,453 A | 1/1996 | Labudde et al. | 355/202 |
| 5,768,417 A | 6/1998 | Errico et al. | 382/186 |
| 5,857,065 A | 1/1999 | Suzuki | 358/1.15 |
| 5,859,628 A | 1/1999 | Ross et al. | 345/173 |
| 5,960,109 A | 9/1999 | Shiau | 382/164 |
| 5,983,073 A | 11/1999 | Ditzik | 455/11.1 |
| 6,023,342 A | 2/2000 | Yanagida | 358/1.15 |
| 6,073,255 A | 6/2000 | Nouri et al. | 714/31 |
| 6,279,000 B1 | 8/2001 | Suda et al. | 707/10 |
| 6,317,823 B1 | 11/2001 | Wakai et al. | 712/220 |
| 7,075,717 B2 * | 7/2006 | Gluch et al. | 359/390 |
| 2001/0051887 A1 | 12/2001 | Jeyachandran et al. | 705/8 |
| 2003/0041116 A1 | 2/2003 | Jeyachandran et al. | 709/217 |
| 2003/0154894 A1 * | 8/2003 | Fransing | 112/470.14 |
| 2004/0163574 A1 * | 8/2004 | Schoenbach et al. | 108/50.01 |
| 2005/0145486 A1 * | 7/2005 | Chen | 204/297.01 |

* cited by examiner

FIG. 7A
FIG. 7B
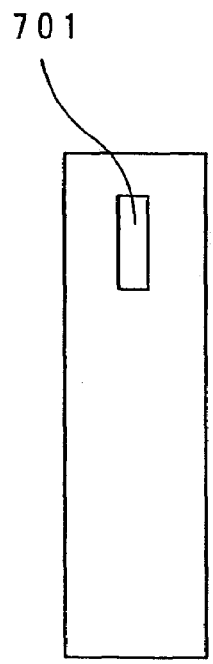
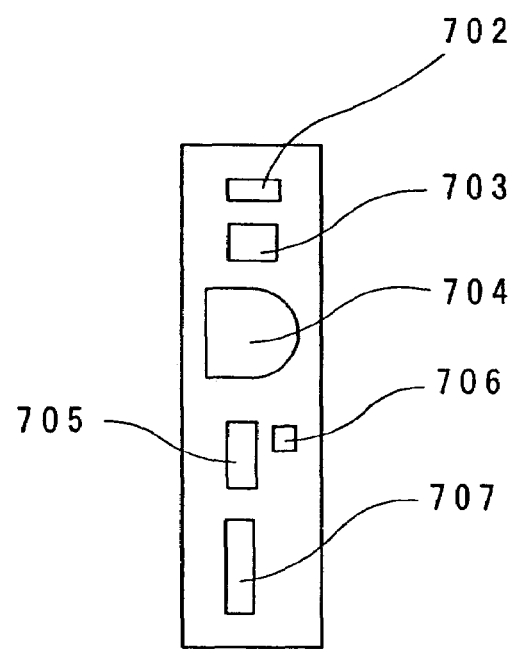

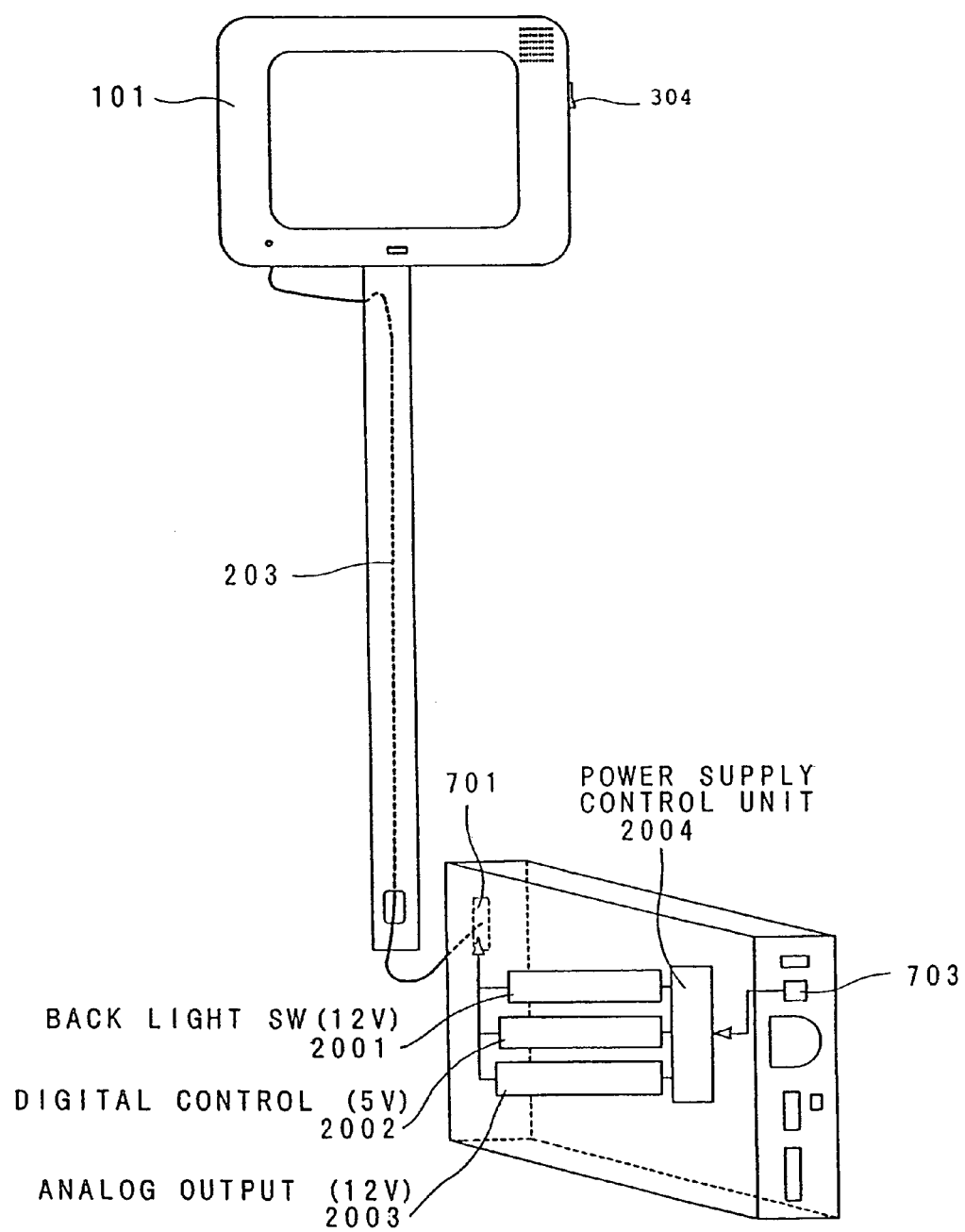

(SIDE VIEW)

INFORMATION PROCESSING APPARATUS WITH AN ADDITIONAL FUNCTION UNIT

This application is a continuation of application Ser. No. 09/178,751, filed Oct.27, 1998.

BACKGROUND OF THE INVENTION

1. Field of the Invention

The present invention relates to an information processing apparatus that has an additional function unit for performing a function in addition to the original functions.

2. Related Background Art

Conventionally, for example, printers are in charge of printing and scanners are in charge of the reading of an image. There are also compound apparatuses that provide the functions of a printer, a scanner and a copier that can read and print information. However, a printer function or a scanner function can not be added to an apparatus that is designed as a copier. Furthermore, since for such OA apparatuses only a button is provided as an input unit and an indicator as a display unit, a variety of commands can not be input and a large amount of information, such as a document or an image, can not be displayed. Therefore, it is not possible for such an apparatus to be operated so that it can access another apparatus to read desired information therefrom and can thereafter display the contents of the information.

Conventionally, an input/output device is provided as a touch panel on which is displayed a menu, and to select a desired function a user touches a specific location on the menu with his or her finger. The touch panel, however, may be destroyed by the application thereon of excessive force by the user. Furthermore, when an operating unit, such as a touch panel, is fixed to the main body of an apparatus, the apparatus itself may fail if excessive force is applied by the user.

Basically, an input/output device, such as the above touch panel, and the main body of the apparatus process information using various types of signals for display, input and power. When such a variety of types of signals is employed, however, the connection between the devices is complicated, and the equipment tends to be adversely affected by noise.

SUMMARY OF THE INVENTION

It is, therefore, one objective of the present invention to provide an information processing apparatus to which can be added a new function that differs from the conventional functions of the apparatus.

It is another objective of the present invention to provide an information processing apparatus to which a unit can be attached for a new function, without any deterioration of the original functions of the apparatus.

It is an additional objective of the present invention to provide an information processing apparatus that can prevent an operating unit from being destroyed, and the apparatus itself from failing as a result of the application of excessive force by a user.

It is a further objective of the present invention to provide an information processing apparatus that can easily be connected to a plurality of devices for the exchange of signals.

According to one aspect, the present invention, which achieves these objectives, relates to an information processing apparatus comprising:

information processing means for performing that information processing that constitutes the original object of the apparatus; and additional processing means for performing other information processing in additional to that which constitutes the original object.

According to another aspect, the present invention, which achieves these objectives, relates to an information processing apparatus comprising:

operating means that is operated by a user by the application of pressure to an operating face; and execution means for processing information based on an operation performed at the operating means, wherein the operating means is so designed that pressure that is applied to the operating face by the user is dispersed.

According to still another aspect, the present invention, which achieves these objectives, relates to an information processing apparatus comprising:

first information processing means;

second information processing means; and a cable by which the second information processing means is connected to the first information operating means for the exchange of several types of information.

Other objectives and advantages, in addition to those discussed above, will become apparent to those skilled in the art during the course of the description of a preferred embodiment of the invention that follows. In the description, reference is made to accompanying drawings, which form a part of the description and which illustrate an example of the invention.

BRIEF DESCRIPTION OF THE DRAWINGS

FIGS. 7A and 7B are side views of the control box;

FIG. 20 is a diagram for explaining a backlight source;

DETAILED DESCRIPTION OF THE PREFERRED EMBODIMENTS

The preferred embodiments of the present invention will now be described while referring to the accompanying drawings.

Figure 1:
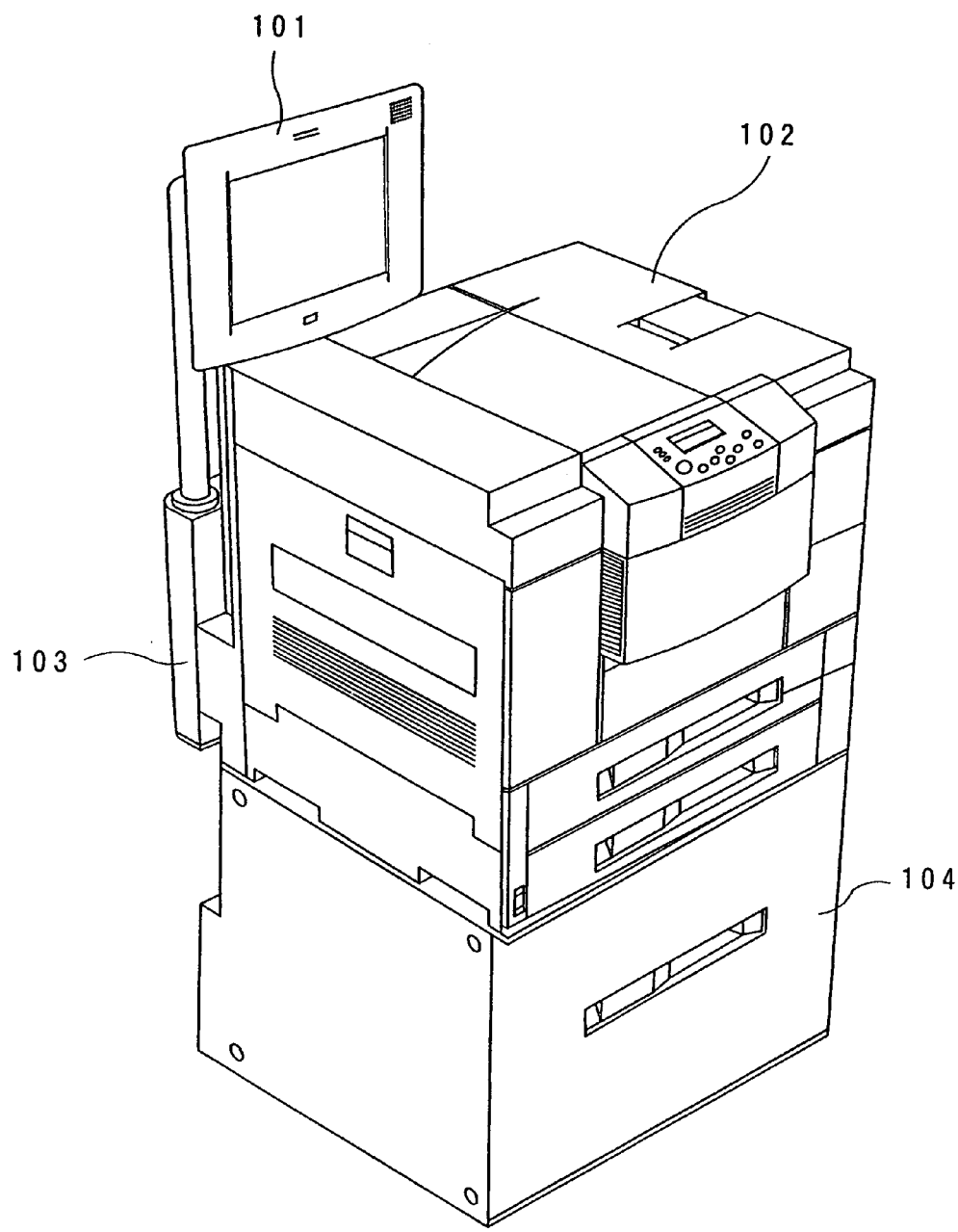
FIG. 1 is a diagram illustrating the arrangement of a printer according to one embodiment of the present invention.

FIG. 1 is a diagram illustrating the arrangement of a printer according to one embodiment of the present invention.

In FIG. 1, a user can enter information by using a finger to touch an operating panel 101. A menu can be displayed for the selection of a single item, or a keyboard can be displayed for the entry of a character string by the touching of keys. The operating panel 101 is supported by a strut that is provided behind a printer main body 102, and is positioned above the printer.

The printer main body 102 prints information for a document or an image that is received from a control box 103. In accordance with the operation displayed on the operating panel 101, or an instruction or information received from an external device, the control box 103 controls the printing performed by the printer main body 102, and also transmits instructions and information to another device. The control box 103 is installed behind the printer main body 102. A pedestal 104 that is optionally installed under the printer main body 102 supplies paper for printing.

Since as is described above the operating panel 101 and the control box 103 are installed behind the printer main body 102, in this embodiment, a manual feeding tray, which is located on the side of the main body 102, can be freely employed and a maintenance cover can be freely opened and closed.

Figure 2:
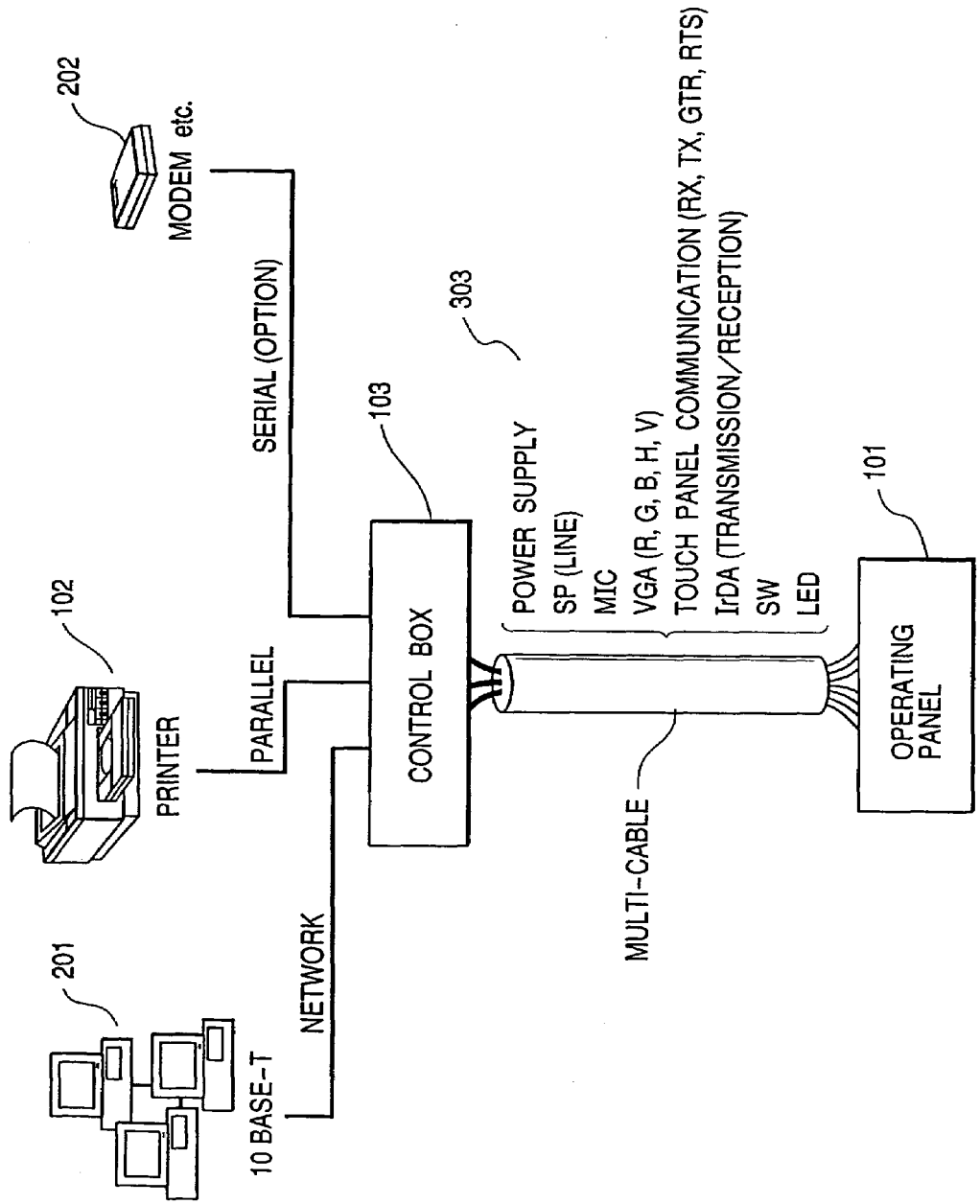
FIG. 2 is a diagram showing the connections to a control box.

FIG. 2 is a diagram showing the connection of the control box and the printer system.

The control box 103 is connected across a network to an apparatus group 201 that includes a host computer and another printer, and is connected to the printer main body 102 via a parallel port. The control box 103 can also be connected to a modem 202 via an optional serial port. Furthermore, the control box 103 is connected to the operating panel 101 via a multi-cable 203. The multi-cable 203 includes multiple cables for the supply of power, for voice input/output, for a display, for touch panel communication, for IrDa transmission/reception, for a switch, and for the control of an LED. The multi-cable 203 will be described in later while referring to FIG. 9.

Figure 3:
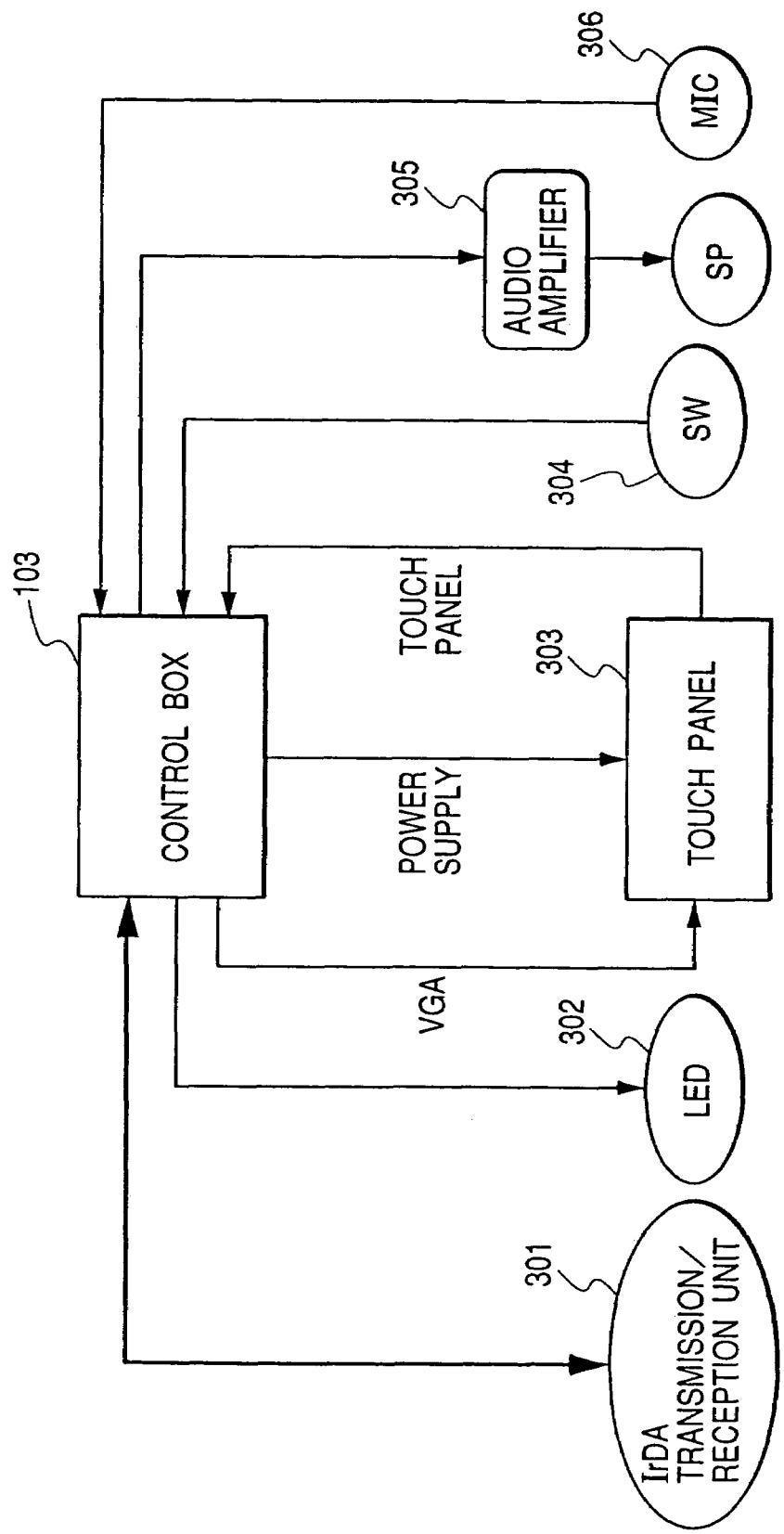
FIG. 3 is a diagram showing the connection between the control box and an operating panel.

FIG. 3 is a diagram showing the connection of the control box 103 and the operating panel 101. All the following connections are performed by the multi-cable 203.

First, an IrDA transmission/reception unit 301 performs infrared communication. This function will be described later while referring to FIGS. 26A through 26D to 28. An LED 302 is a fan stop warning lamp, which will be described later while referring to FIGS. 21 and 22. A touch panel 303 that receives power from the control box 103 also receives a VGA signal for providing a screen display for a GUI and for transmitting touch panel signals (RX, TX, GTR and RTS). A switch 304 is used to turn on or off an LCD backlight, which will be described later while referring to FIG. 20. An audio amplifier 305 receives and amplifies audio output by the control box 103, and outputs the result to a loudspeaker 306. A microphone 307 is used for voice input and for its transmission to the control box 103.

Figure 4:
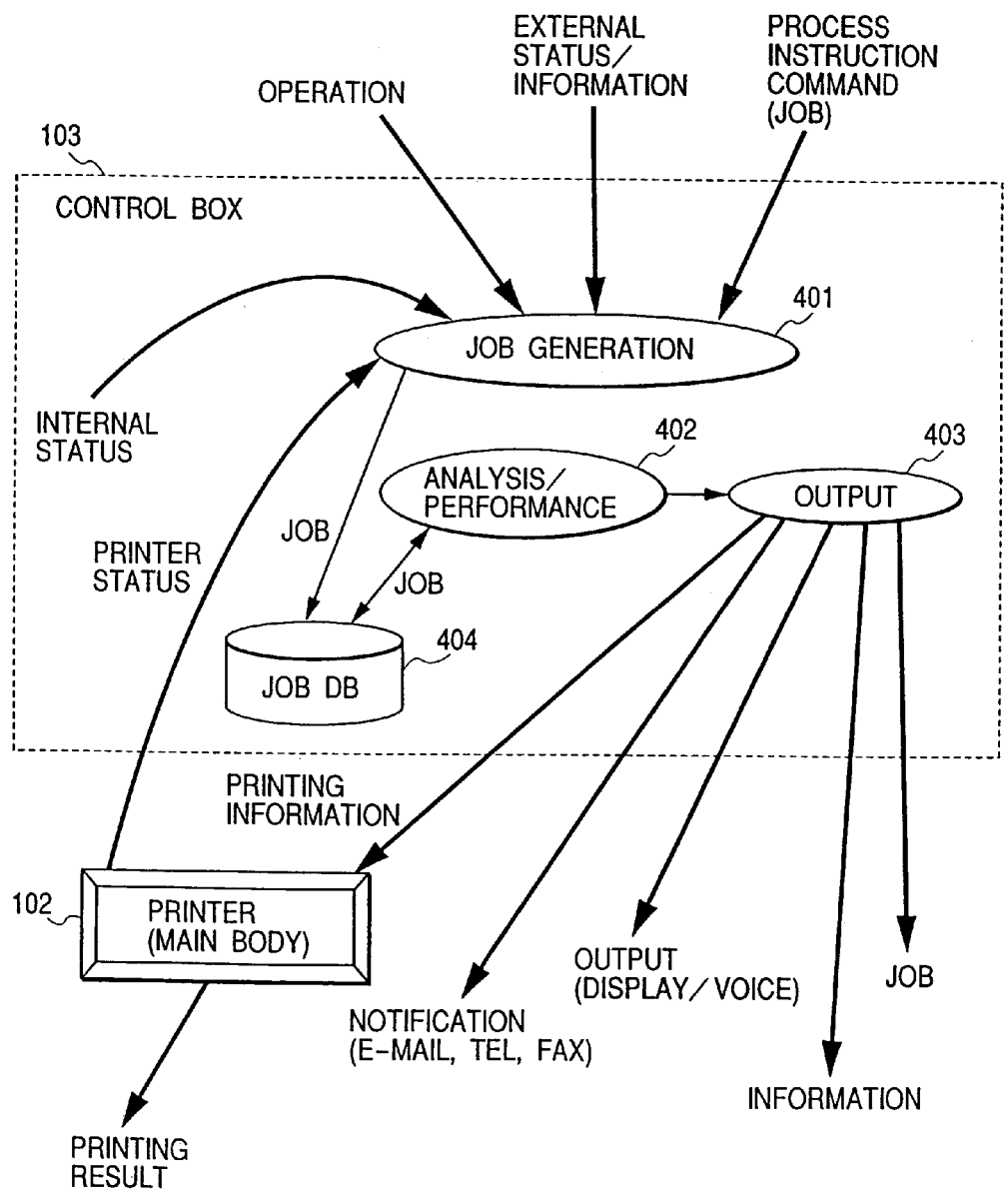
FIG. 4 is a diagram showing the functional arrangement of the control box.

FIG. 4 is a diagram showing the functional arrangement of the control box 103.

As the feature of this embodiment, a process instruction command (job) is handled as one processing unit, and a job generation unit 401, an analysis/performance unit 402 and an output unit 403 are operated at satisfactory timings.

The printer main body 102 is represented as a conventional printer. The printer main body 102, as well as in the prior art, externally receives print information, performs printing in accordance with instructions, and outputs the results.

First, an explanation will be given for a case wherein the operation is initiated by a user. When a user enters information by manipulating the operating panel 101, the job generation unit 401 generates a corresponding job and adds it to a database 404.

The analysis/performance unit 402 examines the job that is added to the database 404, and constantly monitors it to determine whether the performance condition is satisfied. When the performance condition is satisfied, a corresponding process is performed and the database 404 is updated using the job that reflects the results of the process.

When, for example, a user designates a printing time and instructs printing, the job generation unit 401 generates the contents of the operation instructed by the user as a job that it adds to the database 404.

At this time, when the analysis/performance unit 402 finds in the database 404 an unanalyzed job that designates a process to be performed when the operation by the user occurs, i.e., a job "Analyze the contents of an operation by a user and re-register this job", the analysis/performance unit 402 analyzes the contents of the operation, determines a corresponding process, and generates it as a job and adds the job to the database 404.

As a result, the printing process is added as a job to the database 404, the database 404 is updated by regarding the job that represents the contents of the operation by the user as having already been analyzed, and the job for analyzing the operation by the user is re-registered.

When the time designated by the user is reached, the job that was generated for the printing process is performed, print information is generated and is transmitted to the printer main body 102, and a new job, "Reflect print results on a job", is added to the database 404. The printer main body 102 performs printing as instructed, and outputs the print results in the same manner as are the prior art results. When printing is completed, the results of the process are obtained as the printer status from the printer main body 102, and are reflected in a job.

When paper or toner has run out or an error has occurred in the printer main body 102, the job generation unit 401 obtains the change in the status of the printer main body 102 and generates a corresponding job that it adds to the database 404. When, for example, it is ascertained from the printer status obtained from the main body 102 that the toner has run out, the occurrence of the printer status change is generated as a job and is added to the database 404.

If in the database 404 a job is found that designates a process to be performed upon the occurrence of a status change, i.e., a job, "When toner has run out, issue a request that toner be ordered, and re-register this job", a notification process is performed, and the job is re-registered. As a result, each time the same status change occurs, the processing is performed.

Even for a change in the internal status of a portion other than the printer main body 102, the same processing is performed.

An example of this is when the backlight of the liquid touch panel 303 is powered off. When there is found in the database 404 a job that designates a process to be performed upon the occurrence of such a status change, i.e., a job, "When a backlight is powered off, perform initialization and re-register this job", the initialization process is performed and the job is re-registered. As a result, the initialization process that is required for the stable operation of a product can be periodically performed at a satisfactory time.

When a change in the external status is obtained by the job generation unit 401, a corresponding job is generated and is added to the database 404.

When, for example, an error occurs in an external printer connected by a network, the occurrence of the change in the external status is generated as a job, and is added to the database 404. If in the database 404 a job is found that designates a process to be performed upon the occurrence of an external status change, i.e., a job, "When an error occurs in an external printer, issue a job transmission instruction command and re-register this job", the output unit 403 transmits a job transmission instruction command to the printer whereat the error occurred, and this job is re-registered in the database 404. As a result, each time the same status change occurs, the same process is performed.

When a process instruction command (job) is received from an external device, the job generation unit 401 generates a corresponding job and adds it to the database 404.

When a job transmission instruction command is received, the reception of the command is generated as a job, which is added to the database 404.

When in the database 404 a job is found that designates a process to be performed upon the receipt of this job, i.e., a job, "When a job is received, add the received job to a database and re-register this job", a job transmission instruction command is added to the database 404 and the job is re-registered.

When the performance condition of the job transmission instruction command is satisfied, a corresponding transmission process is performed and the job is transmitted.

An explanation will now be given for a case where a print information transmission instruction command is received, which is a command other than the above described job transmission instruction command.

In order to print the information that is stored in another information output device, corresponding print information must be acquired from the required information. The required formation may, for example, be received from another apparatus, but when this method is used, the local apparatus must implement the printing of that information. In this embodiment, therefore, an explanation will be given for another method for transmitting print information that corresponds to the required information.

When a print information transmission instruction command 106 is received from another apparatus, the reception of the command is generated as a job, which is added to the database 404. Then, when the performance conditions for the job are established, a print information transmission process that corresponds to the job is performed. During the print information transmission process, print information is generated using the required information, and is transmitted as instructed.

Upon the receipt of the print information by the information output apparatus, the job generation unit 401 generates as a job the acquisition of the print information, and adds the job to the database 404. As is described above, when the print information transmission instruction command was transmitted, with the assumption that the print information would be received, a job, "Perform printing when print information is received from a transmission destination of a print information transmission instruction command", was added to the database 404. Thus, the printing process was performed, and the received print information was transmitted to the printer main body 102 that then performed the printing and output the results.

In addition to the above described process instruction command, there is a process instruction command for instructing a notification or an output. These process instruction commands may be externally received or may be stored in the database 404 in advance.

When, for example, the performance state of a notification instruction command is established, the notification process is performed by which a notification is issued using an E-mail message or a telephone communication or a facsimile. When the performance condition for an output instruction command is established, the output process is performed to provide a display or to transmit a voice.

Figure 5:
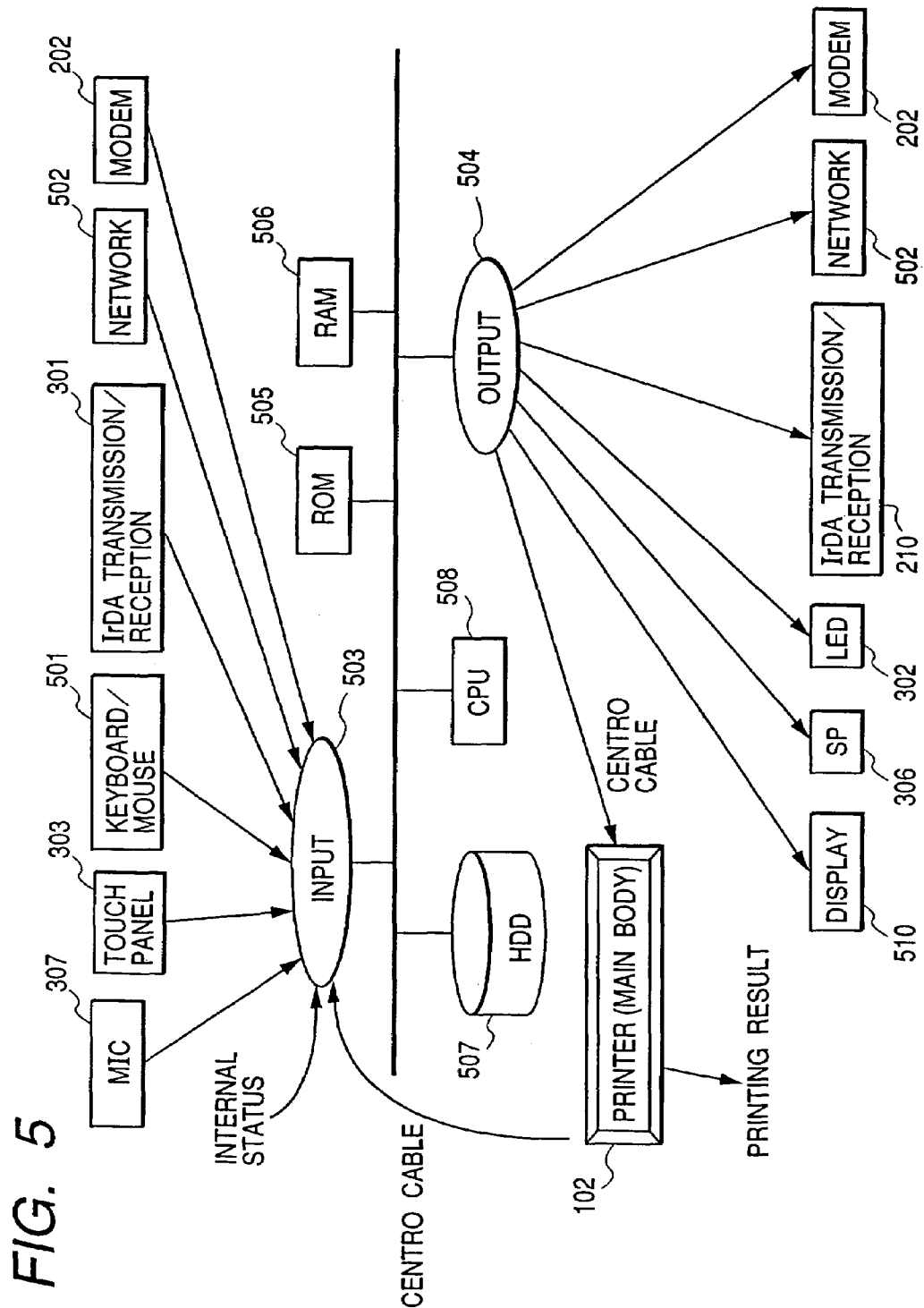
FIG. 5 is a diagram showing the essential hardware arrangement according to the embodiment of the present invention.

FIG. 5 is a diagram showing the essential hardware arrangement according to the embodiment of the present invention. A switch and a fan are not shown.

An information output apparatus for the embodiment of the present invention includes such input devices as a microphone 307, a touch panel 303, a keyboard/mouse 501, an IrDA transmission/reception unit 301, a network 502 and a modem 202, and obtains information from an input unit 503.

The printer status of the printer main body 102 is obtained by the input unit 503 via a centrocable, and an internal status other than that of the printer main body 102 is acquired after it is detected by an internal sensor or monitor.

The processing results are output as information by an output unit 504 to a corresponding output device, such as the printer main body 102, a display 510, a loudspeaker 208, an LED 209, an infrared transmission/reception unit 210, a network 502 or a modem 202. When, for example, the printing process is performed, print information is transmitted to the printer main body 102 via a centrocable. Upon receiving the print information, the printer main body 102 performs the printing and outputs the results. Note that the input unit 503 and the output unit 504 are not always physically separate units.

A CPU 508 executes various programs, including those whose procedures will be described later while referring to flowcharts, and controls the individual sections connected by a system bus 511. The CPU 508 implements the functions of the job generation unit 401, the analysis/performance unit 402, and the output unit 403 by executing corresponding programs.

A ROM 505 is used to store fixed data and programs. A RAM 506 is used to temporarily store data and programs. A hard disk drive (HDD) 507 is used to permanently store programs and data on a hard disk, which functions as the database 404. The system bus 511 is used as a medium for the connection of the above described sections and for the exchange of data, addresses and control signals among the devices.

The programs, including procedures that will be described later while referring to the flowcharts, may be stored in the ROM 505 or, as needed, may be loaded into the RAM 506 from the HDD 507 before the processing is started or during the processing. Instead of the HDD 507, an external storage medium such as an MO drive may be employed.

With the thus described arrangement, a job that corresponds to the input of information is generated by the job generation unit 401, and is added to the database 404 on the hard disk 507. The analysis/performance unit 402 obtains a job from the database 404 on the hard disk 507 and performs a corresponding process, and the output unit 403 outputs the results of the processing.

Figure 6:
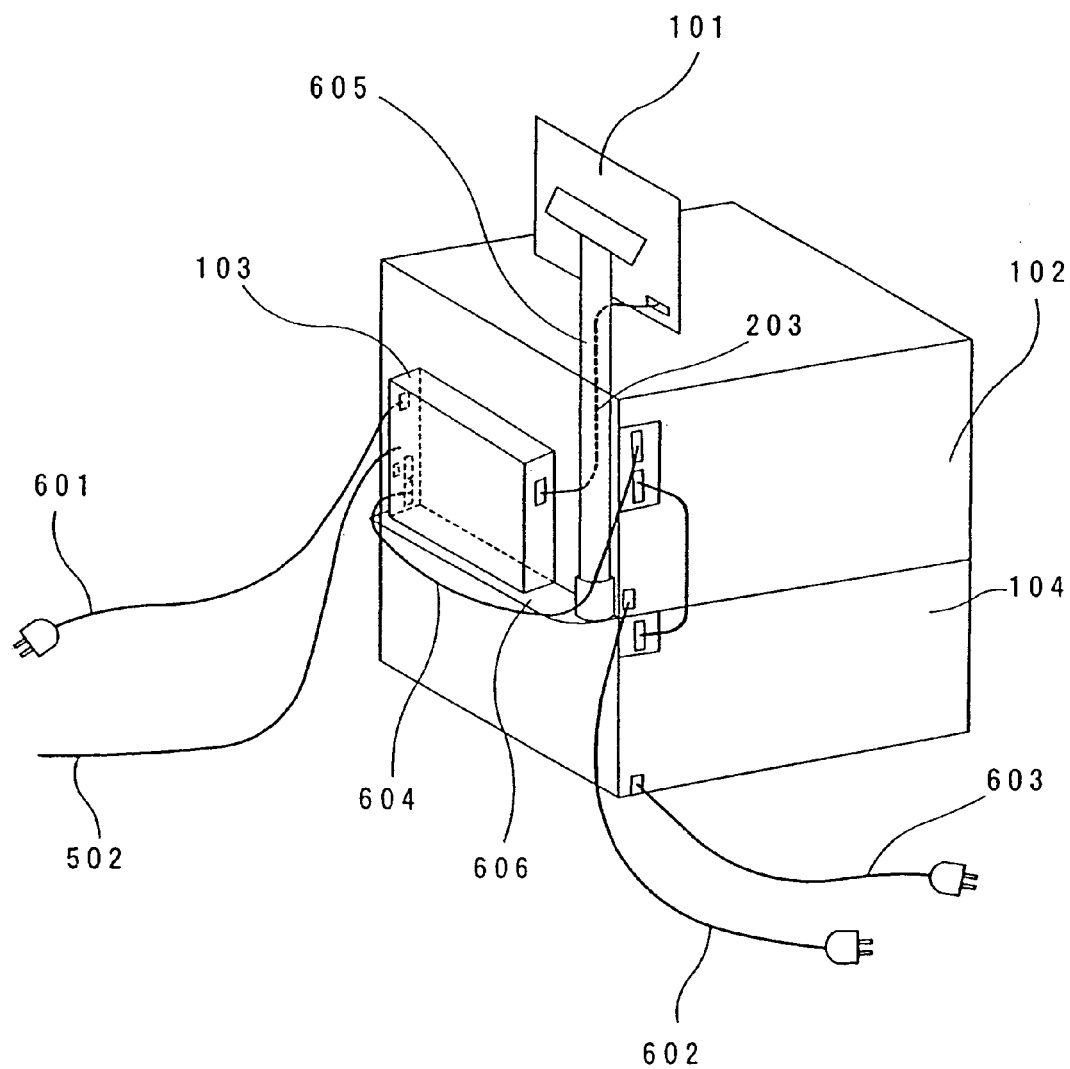
FIG. 6 is a rear view of a printer.

FIG. 6 is a rear view of the printer.

In FIG. 6, a control box power cable 601, a printer power cable 602 and a pedestal power cable 603 are respectively employed to supply power to the control box 103, the printer main body 102, and a pedestal 104. A centrocable 604 connects the control box 103 and the printer main body 102. A strut 605 supports the operating panel 101, and a multi-cable 203 passes through the strut 605.

A plate 606 is sandwiched between the printer main body 102 and the pedestal 104, and the control box 103 and the strut 605 are fixed to the plate 606. A detailed explanation of the plate 606 will be given later while referring to FIG. 17. As is described above, the operating panel 101 is connected to the control box 103 via the multi-cable 203, and the control box 103 is connected to the printer main body 102 via the centrocable 604.

FIGS. 7A and 7B are side views of the control box 103.

In FIG. 7A is shown the side view that is near the operating panel 101, and in FIG. 7B the opposite side is shown. A multi-cable connector 701 is connected to the multi-cable 203 for connection to the operating panel 101. A main switch 702 is used to power the control box 103 on or off. A power connector 703 is connected to the control box power cable 601. An inlet port 704 is used for the intake of external air for an internal fan. A COM port 705 is a serial communication port that uses an RS232C interface. A network cable connector 706 is connected to a cable to provide a connection to the network 502. And a centrocable connector 706 is connected to the centrocable 604 to provide a connection to the printer main body 102.

Figure 8:
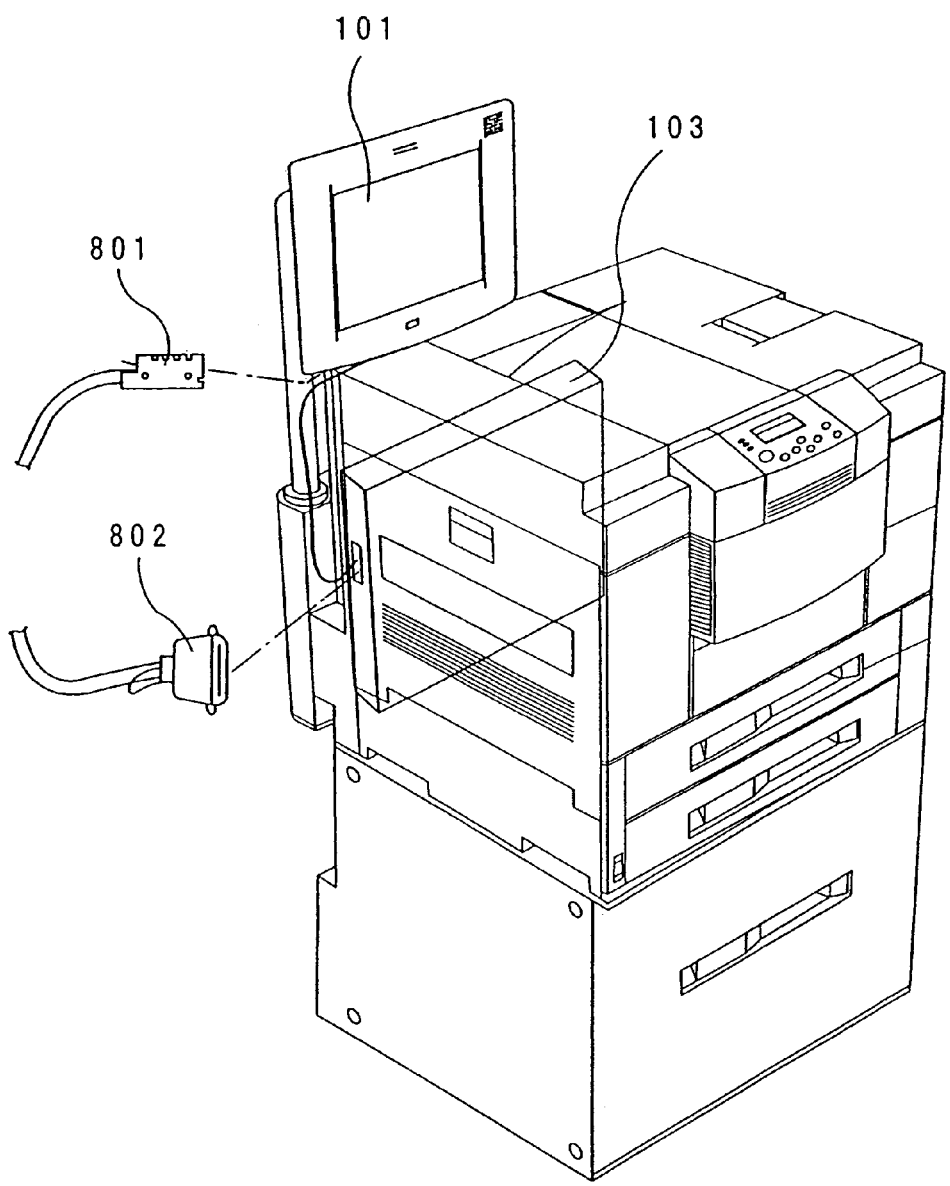
FIG. 8 is a diagram showing the connection between the operating panel and the control box.

FIG. 8 is a diagram showing the connection between the operating panel 101 and the control box 103.

The multi-cable 203 is detachably connected to the operating panel 101 by a connector 801, and is also detachably connected to the control box 103 by a connector 802. Therefore, either the operating panel 101 or the control box 103 can be easily replaced.

Figure 9:
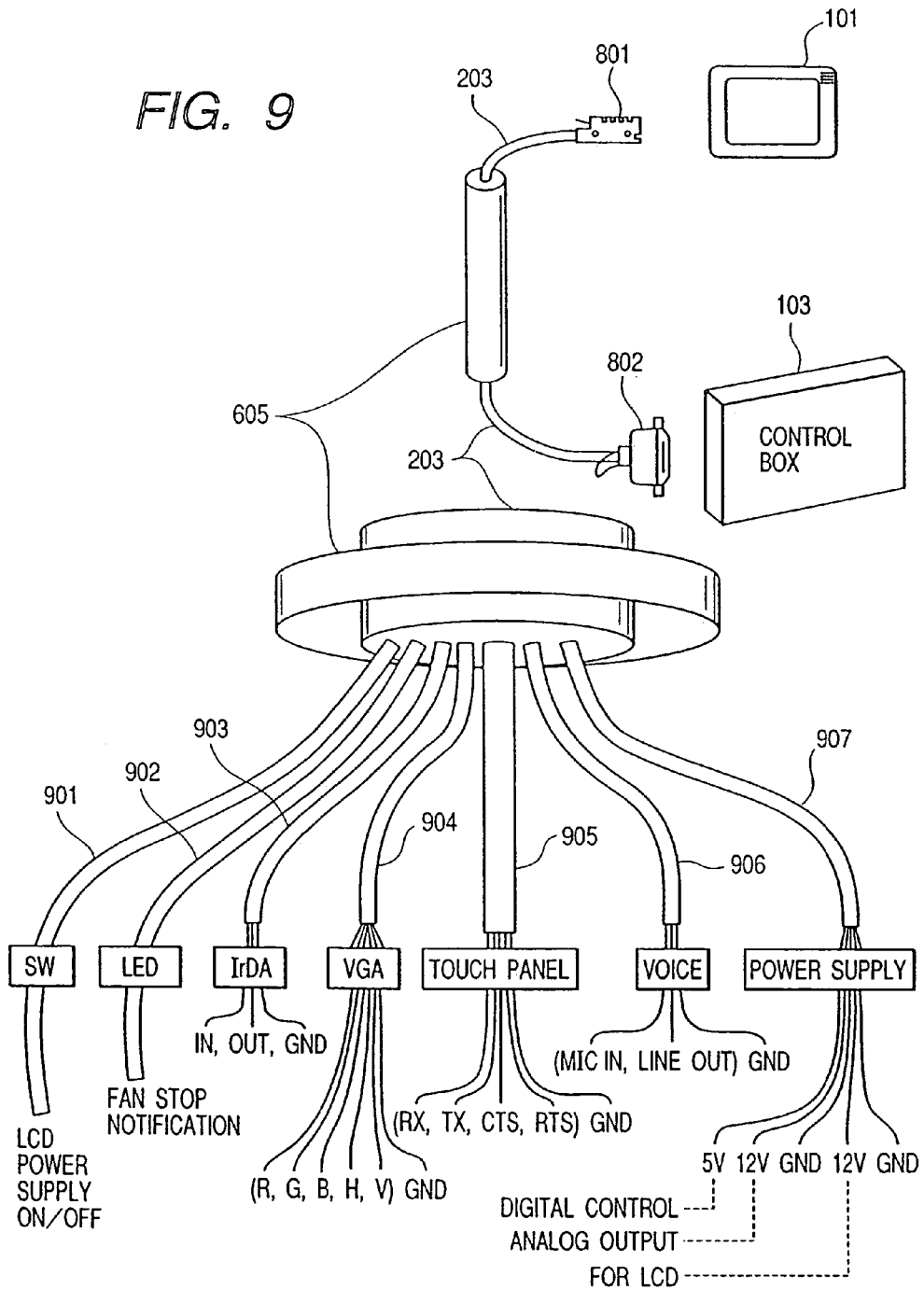
FIG. 9 is a detailed diagram illustrating the arrangement of a multi-cable.

FIG. 9 is a detailed diagram for explaining the arrangement of the multi-cable 203.

The strut 605, which is made of an iron pipe, supports the operating panel 101, and also serves as an external shield for the multi-cable 203. The exterior of the entire multi-cable 203, an assembly of lines, is shielded, and within the external shielding, each of the cables 901 to 907 in the multi-cable 203 is individually shielded.

The cable 901 is used to transmit an LCD power switch signal from the operating panel 101 to the control box 103 when the ON/OFF state of the LCD power switch 304 is instructed on the operating panel 101. The cable 902 is used to transmit a fan stop notification signal from the control box 103 to the operating panel 101 in order to change the color of the LED and thus notify a user that the fan in the control box 103 has been halted. The cable 903 is used for the infrared communication of information between the control box 103 and the operating panel 101, and for grounding (GND). The cable 904 is used for the transmission of image display information (R, G, B, H and V), and for grounding (GND). The cable 905 is used for the transmission of information (RX, TX, CTS and RTS) entered at the touch panel, and for grounding (GND). The cable 906 is used for the transmission of audio input information (Mic in) and output information (Line Out), and for grounding (GND). And the cable 907 is used for a 12 V analog output power supply, a 5 V digital control power supply and a 12 V LCD power supply, and for grounding (GND).

As is described above, the function for the electronic transmission of a plurality of sets of information is provided for the multi-cable 203 that connects the control box 103 and the operating panel 101.

Figure 10:
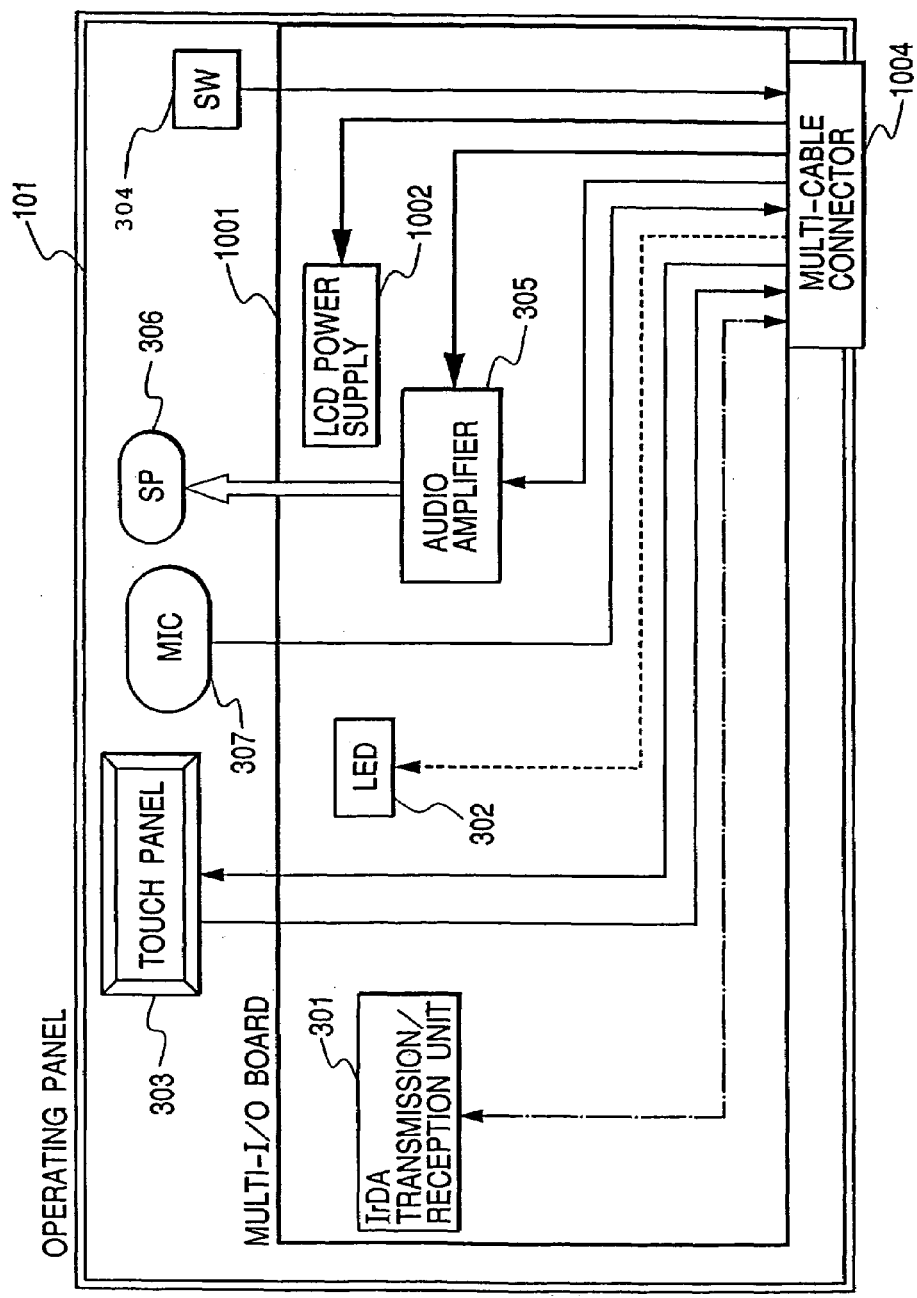
FIG. 10 is a diagram illustrating the arrangement of a multi-input/output board.

FIG. 10 is a diagram showing the arrangement of a multi-input/output (I/O) board.

A multi-I/O board 1001 is provided inside the operating panel 101, and is connected to the multi-cable 203 by a multi-cable connector 1004. The IrDA transmission/reception unit 301 transmits or receives infrared information. An LED 302 emits light in accordance with a signal received from the fan stop notification unit, and signals the halting of the fan. The audio amplifier 305 amplifies voice information received from a voice output process unit 1106, which will be described later, and outputs the results to the loudspeaker 306. An LCD power source 1002 is an LCD backlight power source, which only turns off the LCD backlight, while the power for an LCD is separately supplied in order to extend the service life of the backlight. With the LCD backlight power switch 304, a signal is transmitted to an LCD power supply SW process unit 1108, which will be described later. Information that is entered by touching the touch panel 303 is transmitted to an RS232C reception unit 1103, which will be described later, and display information that is received from a VGA 1102, which will be described later, is displayed on the screen. Vocal data, which is input at the microphone 307, is transmitted to a voice input processing unit 1105, which will be described later.

As is described above, a plurality of functions are provided for a single multi-I/O board 1001.

Figure 11:
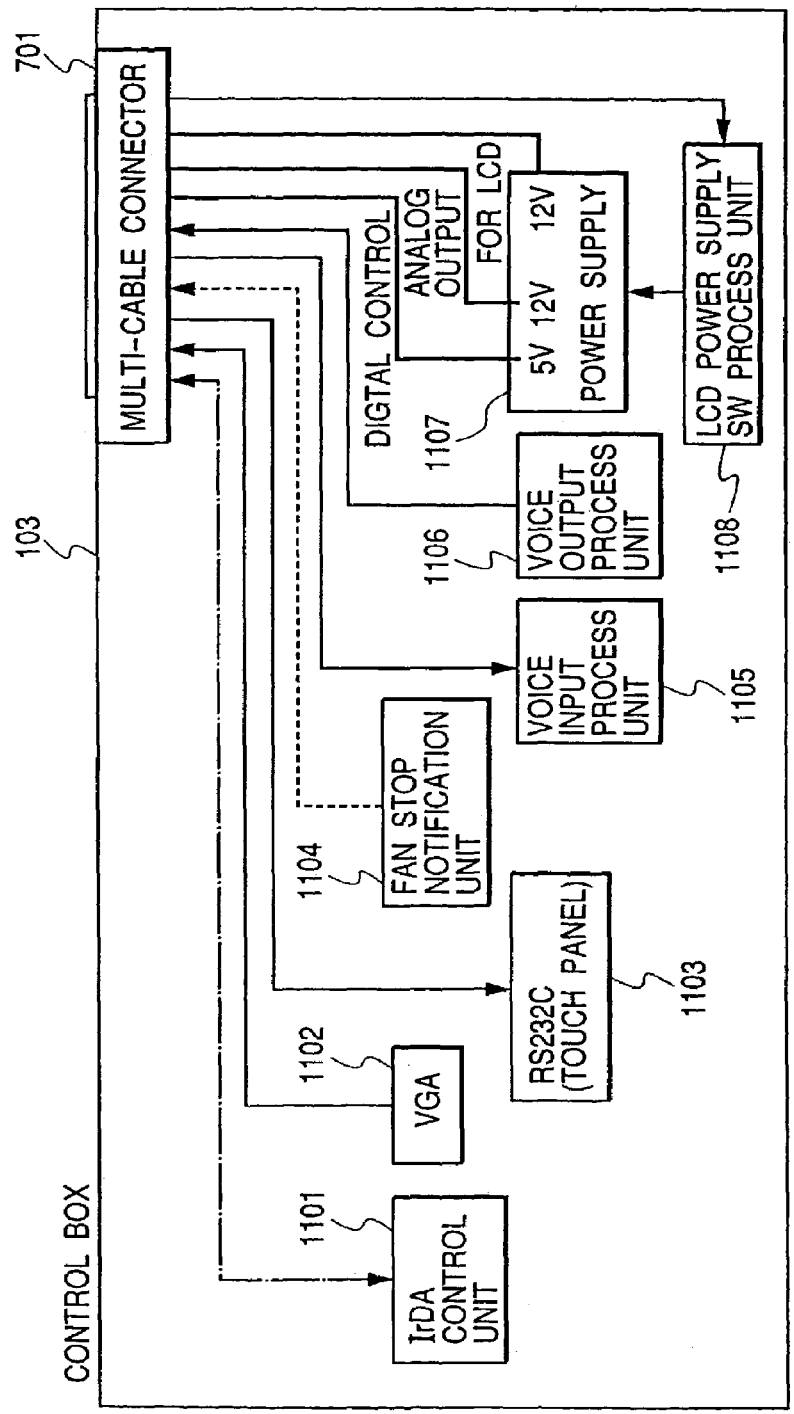
FIG. 11 is a diagram showing the functional arrangement of the control box.

FIG. 11 is a diagram illustrating the functional arrangement of the control box 103.

An IrDA control unit 1101 processes infrared communication information. The VGA 1102 transmits display information to the screen of the touch panel 303. The RS232C reception unit 1103 receives information from the touch panel 101. The fan stop notification unit 1104 receives signals from the CPU fan and the external air inlet fan, and transmits a notification signal to the LED 302 when either or both of the fans are halted. The voice input process unit 1105 receives vocal data entered at the microphone 307, and processes it. The voice output processing unit 1106 outputs vocal data as line information to the audio amplifier 305. A power supply 1107 has a 5 V analog output power source, a 12 V digital control power source, and a 12 V LCD power source. And the LCD power supply SW processing unit 1108 receives a signal from the switch 304 and transmits it to the power supply 1107, and halts the supply of power to the LCD power supply 1002.

Figure 12:
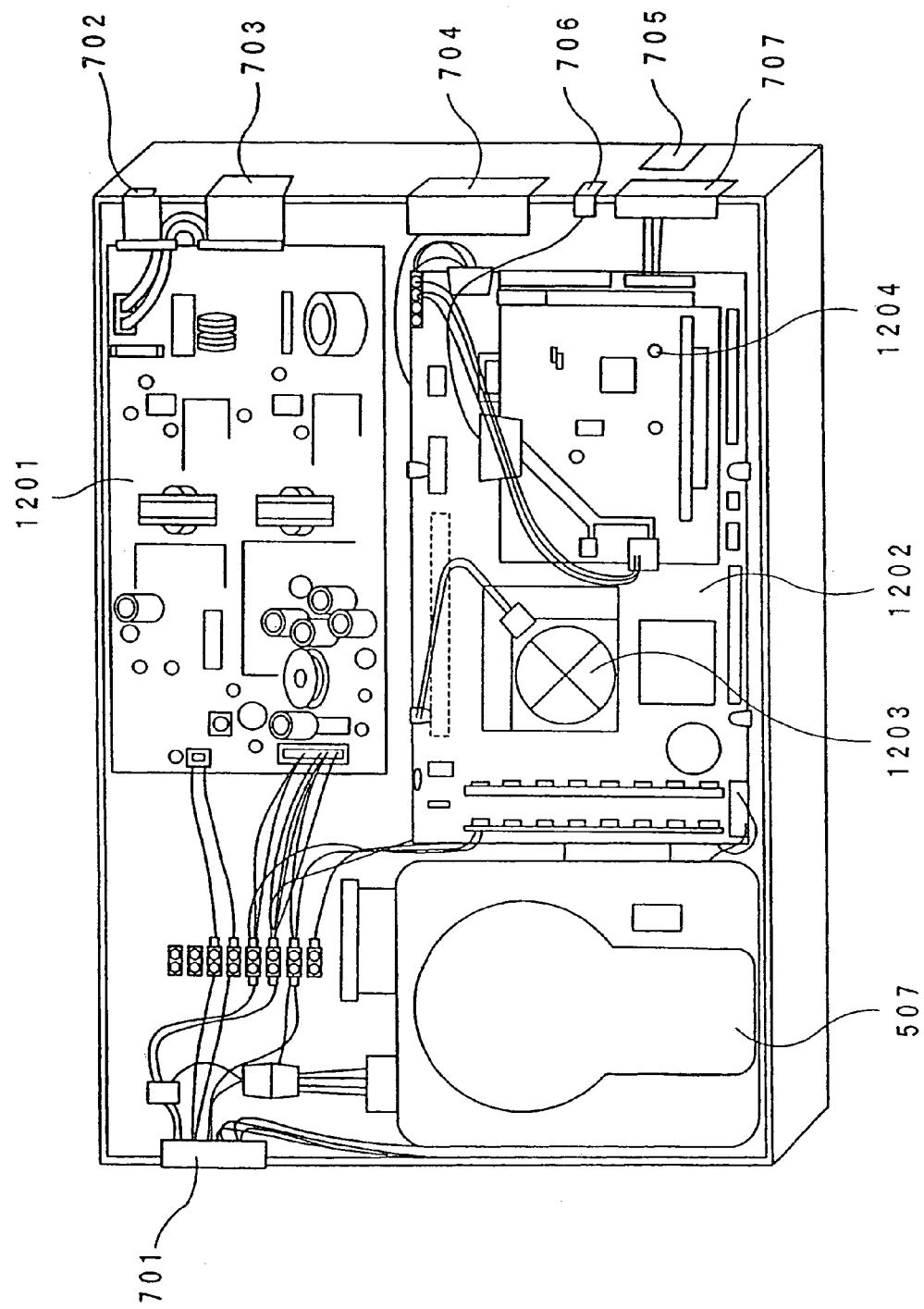
FIG. 12 is a diagram showing the internal arrangement of the control box.

FIG. 12 is a diagram illustrating the internal arrangement of the control box 103.

The control box 103 includes the hard disk drive 507, a power control unit 1201, a CPU board 1202, and a D board 1204.

The power control unit 1201 has a 5 V analog output power source, a 12 V digital control power source, and a 12 V LCD power source. A single power source is divided into two segments to separately provide an input/output board power source (digital control and analog output) and a backlight power source.

The CPU board 1202 includes the voice output processing unit 1106, the voice input processing unit 1105, the RS232C reception unit 1103, the VGA 1102, the IrDA control unit 1101, and the CPU fan 1203. The IrDA control unit 1101 is attached to the CPU and an associated control unit. And the D board 1204 is constituted by the IrDA control unit 1101 and the fan stop notification unit 1104.

Since the IrDA board is divided into a control unit (D board) and a transmission/reception unit (S board), the maintenance job and upgrading job for the control unit are facilitated. Detection signal lines for the CPU fan 1203 and for the external inlet fan are collected into one line on the board for connection to the fan stop notification unit 1104. In addition, a variety of signal lines are collected together by the multi-cable connector 701 to form a single multi-cable.

Figure 13A:
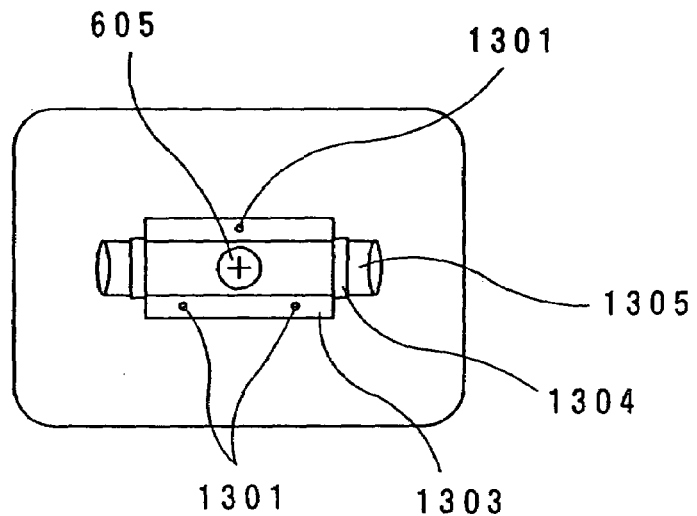
FIGS. 13A and 13B are diagrams for explaining what happens when a user applies force to the operating panel.
Figure 13B:
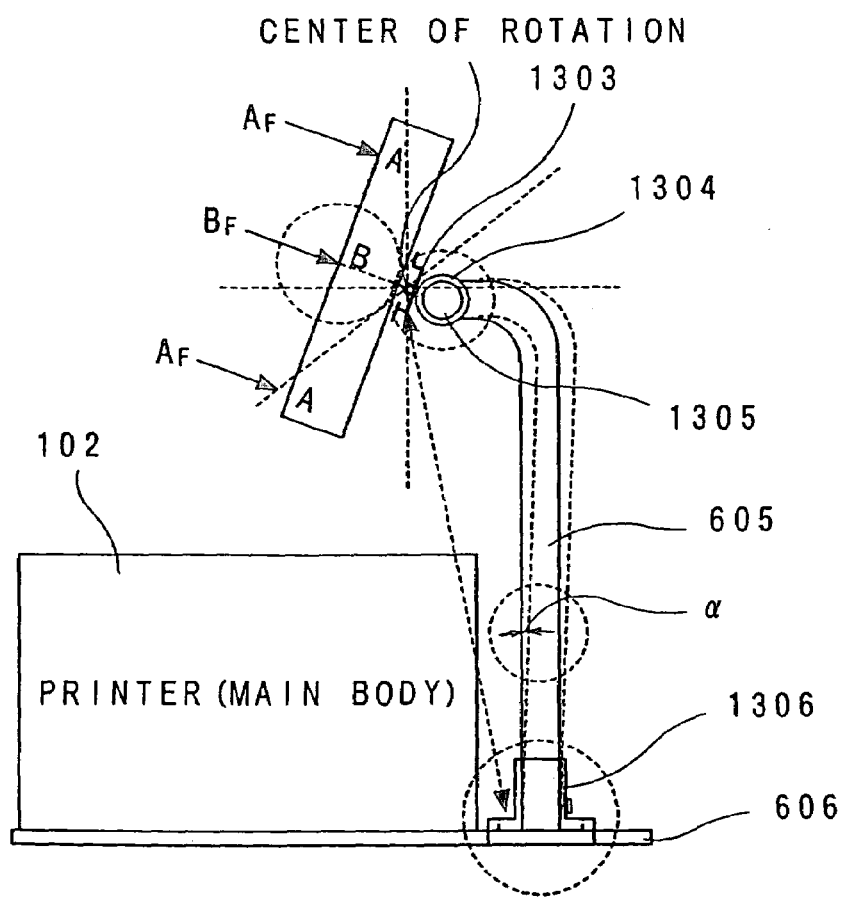

FIGS. 13A and 13B are diagrams for explaining what occurs when pressure is applied to the operating panel 101. FIG. 13A is a rear view of the operating panel 101, and FIG. 13B is a side view.

As is shown in FIG. 13B, the upper end of the strut pipe 605 is bent forward toward the front of the printer main body 102, and at its distal end a pipe 1305 is horizontally fixed so as to form the crosspiece of a T. These components are integrally formed by welding. Pipe clips 1304 encircle the pipe 1305 and rotate around and tightly engage it at either end. The pipe clips are secured to the operating panel 101 by a rear metal fitting 1303 and screws 1301, so that the operating panel 101 can be vertically inclined when the pipe clips 1304 are rotated around the pipe 1305.

The plate 606 is held stationary by the weight of the printer main body 102, and a pipe block 1306 is secured to the plate 606 by screws. The strut pipe 605 is inserted into the pipe block 1306 and is secured therein by screws.

With this arrangement, in this embodiment, when excessive force is applied during the manipulation of the operating panel 101, the entire operating panel 101 is moved in response to the pressure to prevent the deformation of the touch panel 303. Thus, 1. the strength of the force that is applied is reduced by the tilting of the operating face; 2. since the operating panel 101 rotates, general damage to the panel 101 is prevented; 3. since the strut pipe 605 is flexibly bent, it absorbs the force of an impact and reduces the strength of the pressure that is applied; and 4. the distance between the rotation center and the base also absorbs the force of an impact and reduces the strength of the pressure that is applied.

Specifically, in FIG. 13B, when a force AF is applied to a point A on the operating panel 101, the panel 101 is turned to prevent the deformation of the panel 101.

And when a force BF is applied to a point B at the center of the operating panel 101, although the panel 101 does not turn, since the strut pipe 605 is deformed (bent), damage to the panel 101 can be prevented. That is, the pipe is bent at an angle of $\alpha$ so that the force BF that bends the strut away from its original position >destruction force limit>BF cos $\alpha$.

Figure 14:
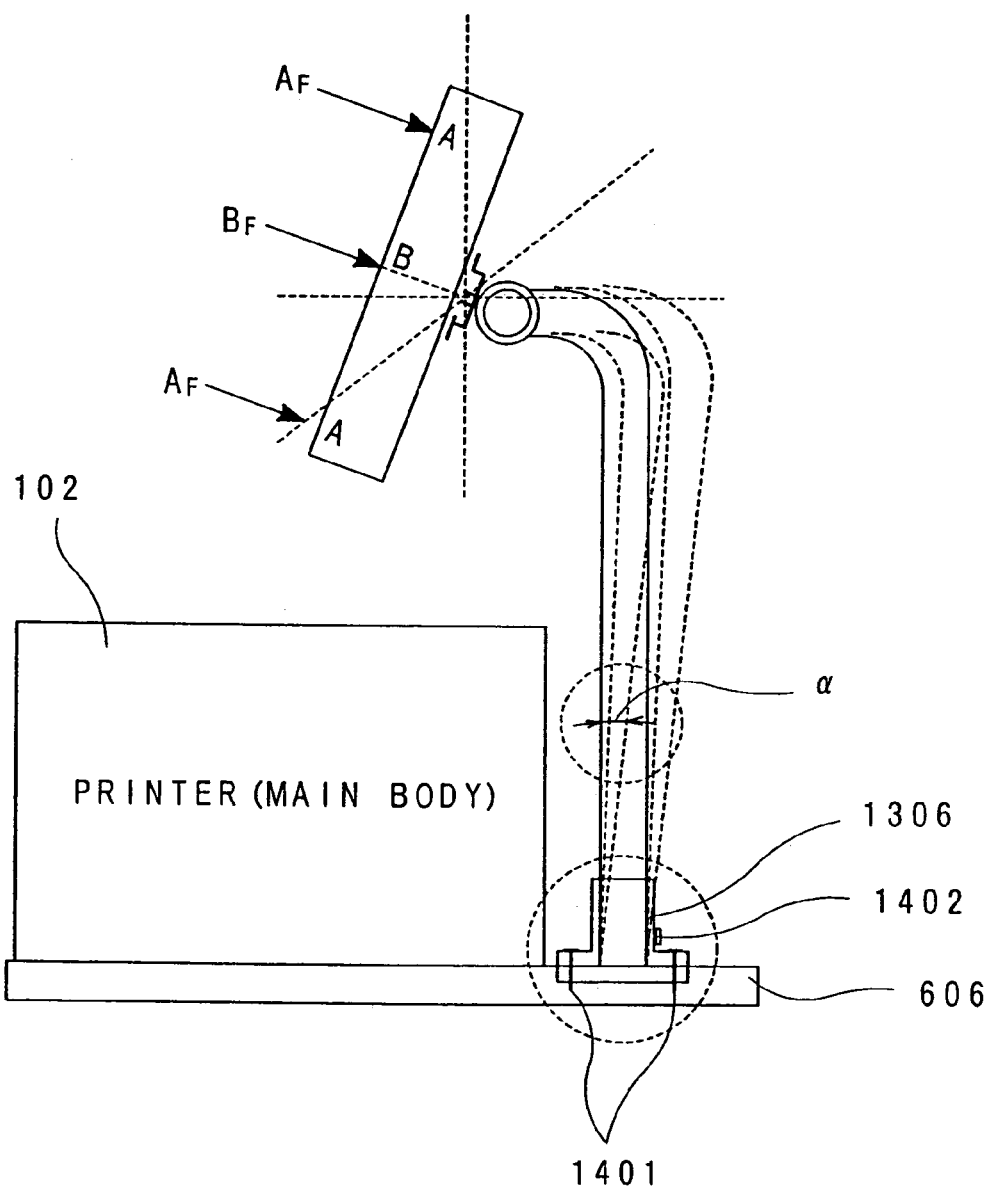
FIG. 14 is a diagram for explaining what happens when a user applies a great amount of force to the operating panel.
Figure 15:
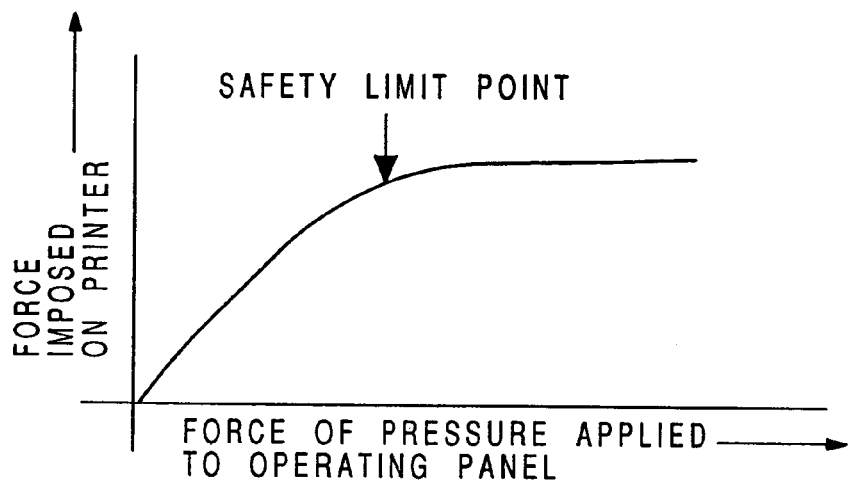
FIG. 15 is a graph showing the relationship between the force applied for pressing the operating panel and the force applied to the printer.

FIG. 14 is a diagram for explaining what happens when excessive force is applied to the operating panel 101. FIG. 15 is a graph showing the relationship between the force of the pressure applied to the operating panel 101 and the force imposed on the printer.

In FIG. 15, when the operating panel 101 is pushed with such force that the safety limit point is exceeded, the printer will be upset. But in this embodiment, when a great deal of force is applied, instead of the entire system being upset and damaged, only a part of the system is damaged.

Figure 18A:
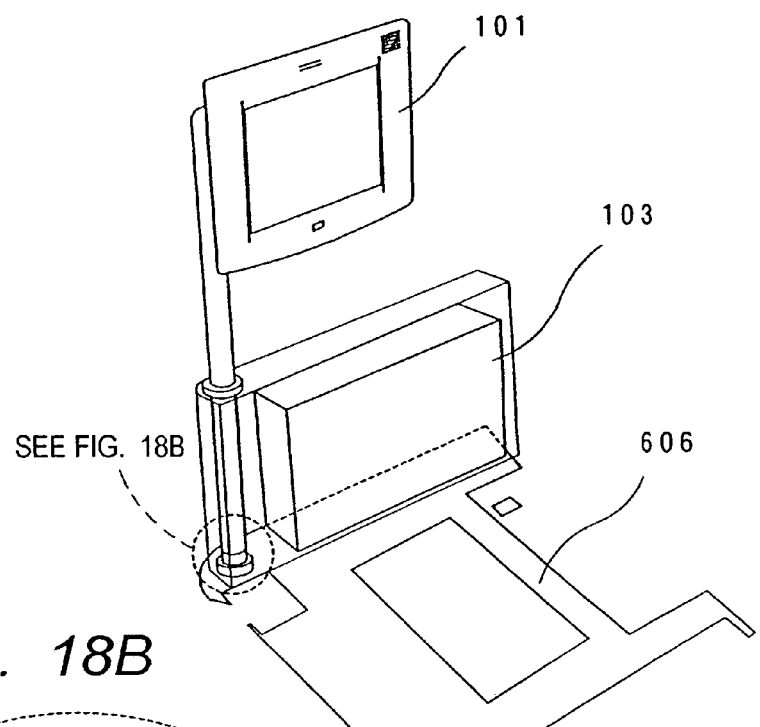
FIG. 18 which includes FIGS. 18A to 18B, provides diagrammatical illustrations for use in explaining the method for securing a strut pipe.
Figure 18B:
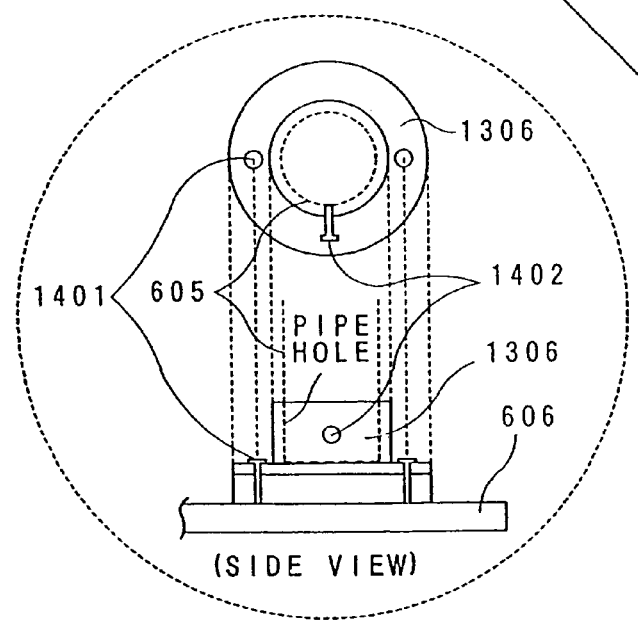

FIG. 18 provides diagrammatical illustrations for use in explaining the method by which a strut pipe is secured.

First, at two locations the pipe block 1306 is secured to the plate 606 with pipe block screws 1401. The strut pipe 605 is then inserted into the fixed pipe block 1306 and is secured therein by a pipe fixing screw 1402 that passes through a pipe hole formed in the side of the pipe block 1306.

In FIG. 14, when excessive force is imposed on the operating panel 101, the pipe fixing screw 1402 with which the strut pipe 605 is secured in the pipe block 1306 is loosened or destroyed, or else the pipe block fixing screws 1401 with which the pipe block 1306 is secured to the plate 606 are loosened. Specifically, when a force that bends the strut pipe 605 at an angle that is greater than an angle $\alpha$ is imposed on the operating panel 101, BF>destruction force limit>BF cos $\alpha$ is established and causes the destruction of securing components.

Figure 16:
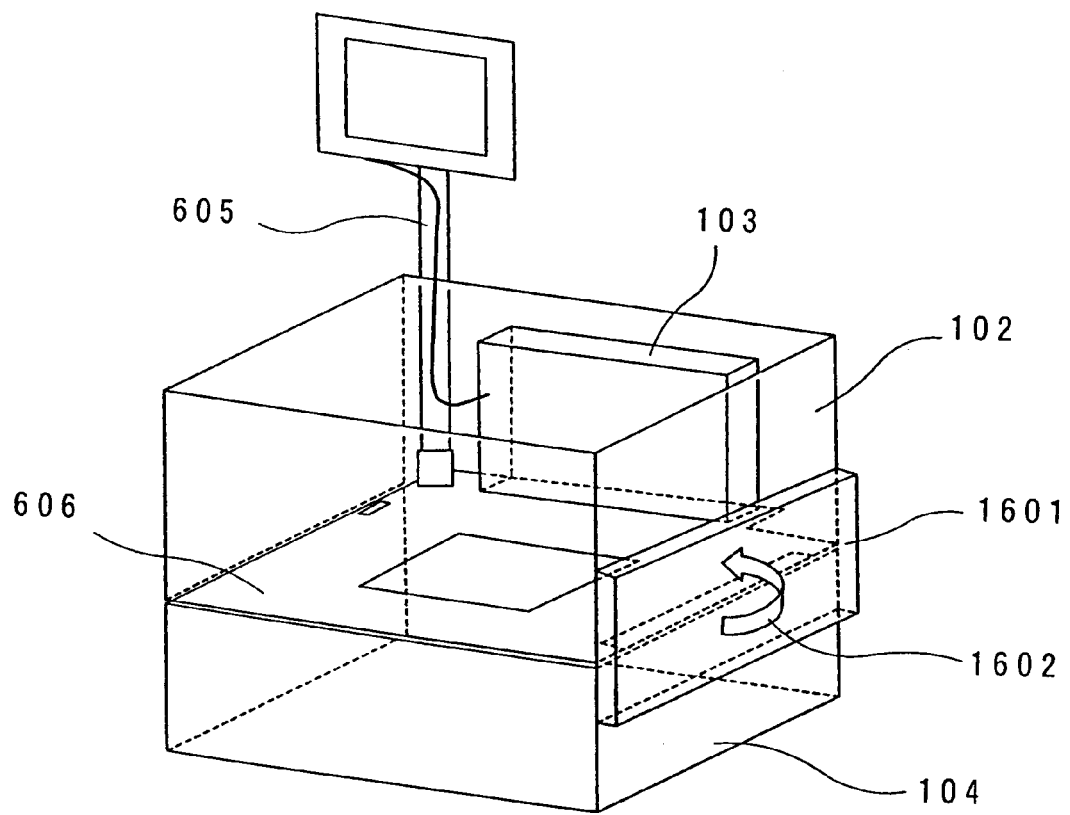
FIG. 16 is a diagram for explaining the location of the control box when a pedestal is attached.

FIG. 16 is a diagram for explaining the positioning of the control box 103 when the pedestal 104 is attached.

In FIG. 16, a paper feeding mechanism 1601 feeds paper from the pedestal 104 along a feeding path 1602. The plate 606 is sandwiched between the printer main body 102 and the pedestal 104, and the strut 605 and the control box 103 are fixed thereto. Thus, the strut 605 and the control box 103 can be secured using the weight of the printer main body 102, and need not be directly attached to the printer main body 102.

The plate 606 is not mounted on the pedestal 104, and is so formed that the control box 103 and the strut 605 can be easily secured thereto.

Figures 17A, 17B, 17C, 17D:
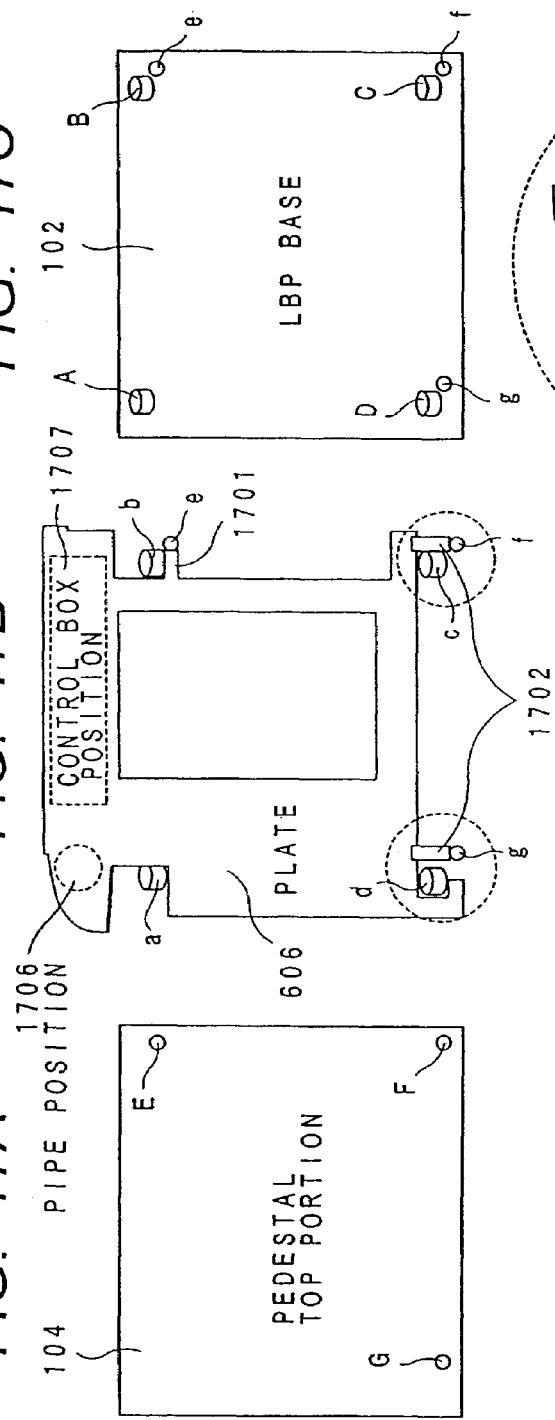
FIG. 17 which includes FIGS. 17A to 17D, provides diagrammatical illustrations for use in explaining the positional relationship of the pedestal and the printer main body and a plate.

Specifically, and with reference to FIG. 17, a projection 1701 is formed by notching the leg portion of the printer main body 102. The projection 1701 and an insertion rod 1702 are inserted into a metal pin stopper 1705, and the insertion rod 1702 is secured by screws 1703, so that the pedestal 104 and the printer main body 102 can be secured to each other at three points using a positioning pin 1704 and the metal stopper

1705. As a result, the control box 103 can be installed without affecting the paper feeding mechanism 1601 of FIG. 16 and the structure (the height) of the printer main body 102, and without disturbing the paper feeding function. Since the projection 1701 and the insertion rods 1702, which is not integrally formed with the plate 606, are employed for the securing of elements, the positioning and the securing of the elements can be facilitated.

When the shape of the plate 606 is changed in accordance with the model, it can cope with any type of apparatus, and the strut 605 and the control box 103 can be attached without changing the shape of the main body.

FIG. 17 provides diagrammatical illustrations for use in explaining the positional relationship between the pedestal 104, the printer main body 102, and the plate 606.

In FIG. 17, points A, B, C and D on the bottom of the printer main body 102 denote the legs of the main body 102, and points a, b, c and d on the plate 606 denote positions whereat the legs A, B, C and D of the printer main body 102 are placed. Points E, F and G on the top of the pedestal 104 denote positioning points for determining the position at which the printer main body 102 is mounted. Points e, f and g on the bottom of the printer main body 102 denote pin holes that correspond to the positioning pins E, F and G.

The insertion rods 1702 are inserted into the metal stoppers 1705 that support the positioning pins 1704, until the rods 1702 contact the positioning pins 1704. The other ends of the insertion rods 1702 are fixed to the plate 606 by the insertion rod fixing screws 1703. The projection 1701, which is integrally formed with the plate 606, is also inserted into a metal stopper 1705. Instead of forming projections at all the three points for securing the plate 606, the insertion rods 1702 are fixed to the plate 606 by using the insertion fixing screws 1703, so that the securing of the plate 606 is facilitated.

Figure 19A:
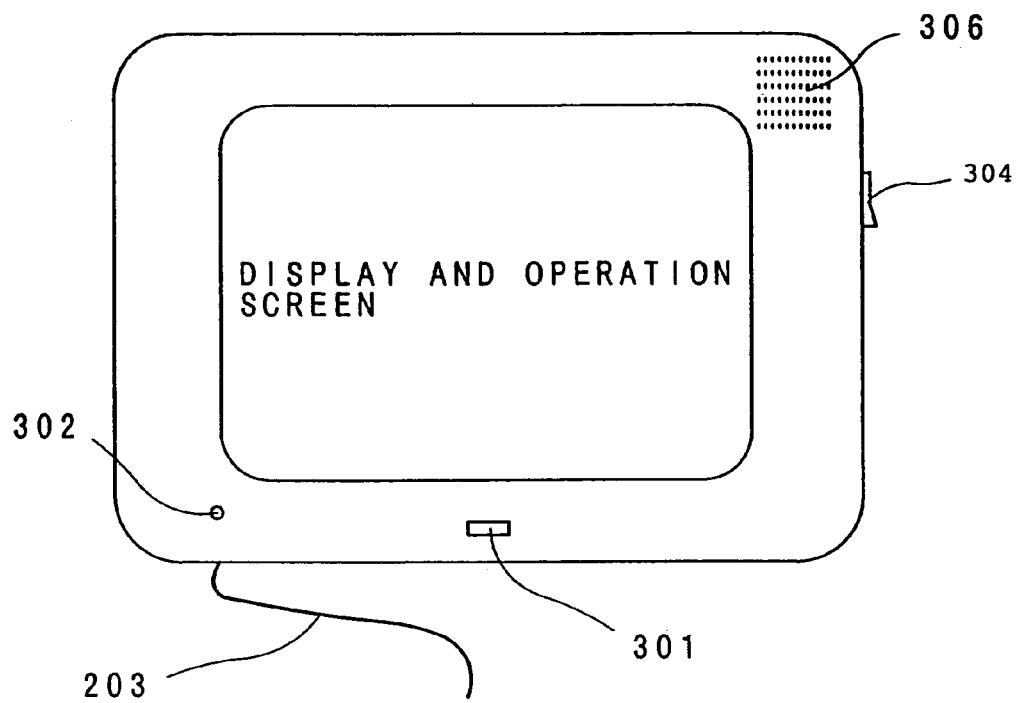
FIGS. 19A and 19B are diagrams showing the external appearance of the operating panel.
Figure 19B:
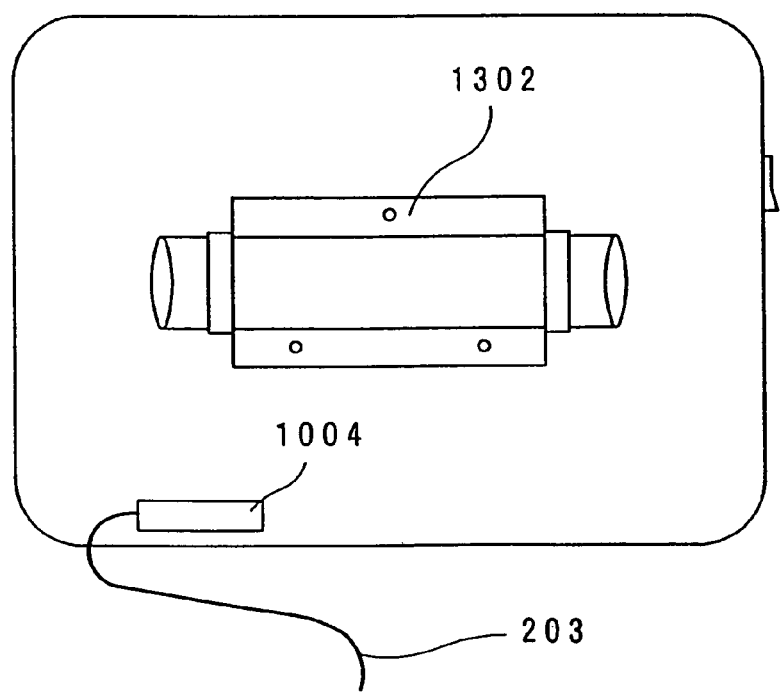

FIGS. 19A and 19B are diagrams showing the external appearance of the operating panel 101. FIG. 19A is a front view and FIG. 19B is a rear view.

The touch panel 303, which constitutes a display and an operating screen, the loudspeaker 306, the IrDA transmission/reception unit 301, and the LED display unit 302 are provided on the front face of the operating panel 101. The multi-cable connector 701 is provided on the rear face, and the rear metal fitting 1302 is secured by screws so as to attach the operating panel 101 to the strut 605 via the pipe clips. The backlight power switch 304 is provided on the side.

FIG. 20 is a diagram for explaining the backlight power source. The backlight switch 304 is used only to turn off the screen display.

When the liquid crystal screen of the operating panel 101 is in constant use, deterioration of the quality of the displayed images will occur. To avoid this, the display screen is frequently turned off when its use is not required. However, as the operating panel 101 does not have an independent power source it receives power from the control box 103, and the power supplied by the control box 103 can not be turned off because the printer itself may be in constant use.

In this embodiment, therefore, as was explained while referring to FIG. 11, the power supply in the control box 103 is separated, and as the power supply switch process unit 1108 halts an instruction signal for the ON/OFF operation of the backlight power switch 304, it is possible to turn off only the screen display.

Figure 21:
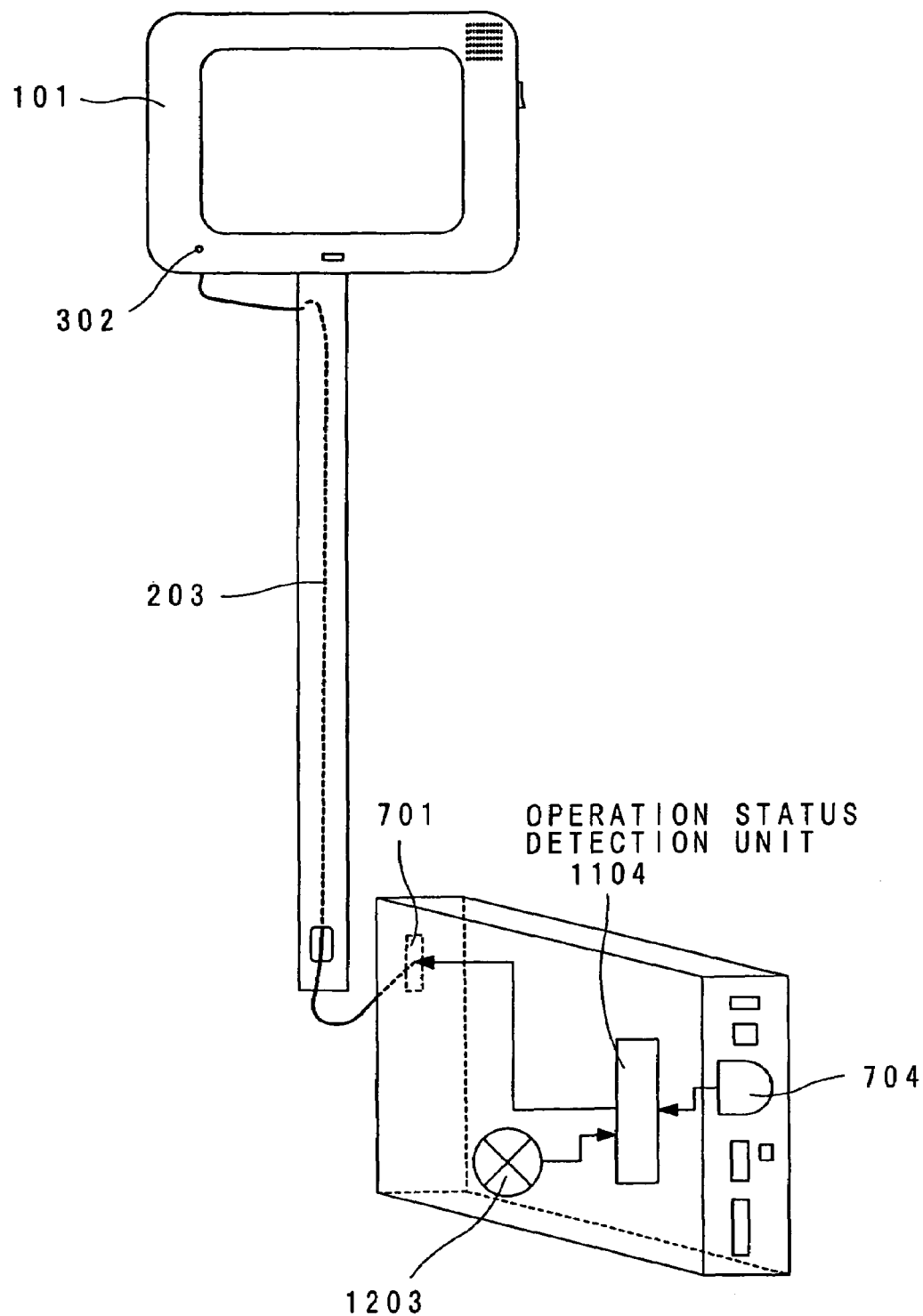
FIG. 21 is a diagram for explaining the arrangement for lighting a pilot lamp.

FIG. 21 is a diagram for explaining the arrangement for lighting a pilot lamp.

Figure 22:
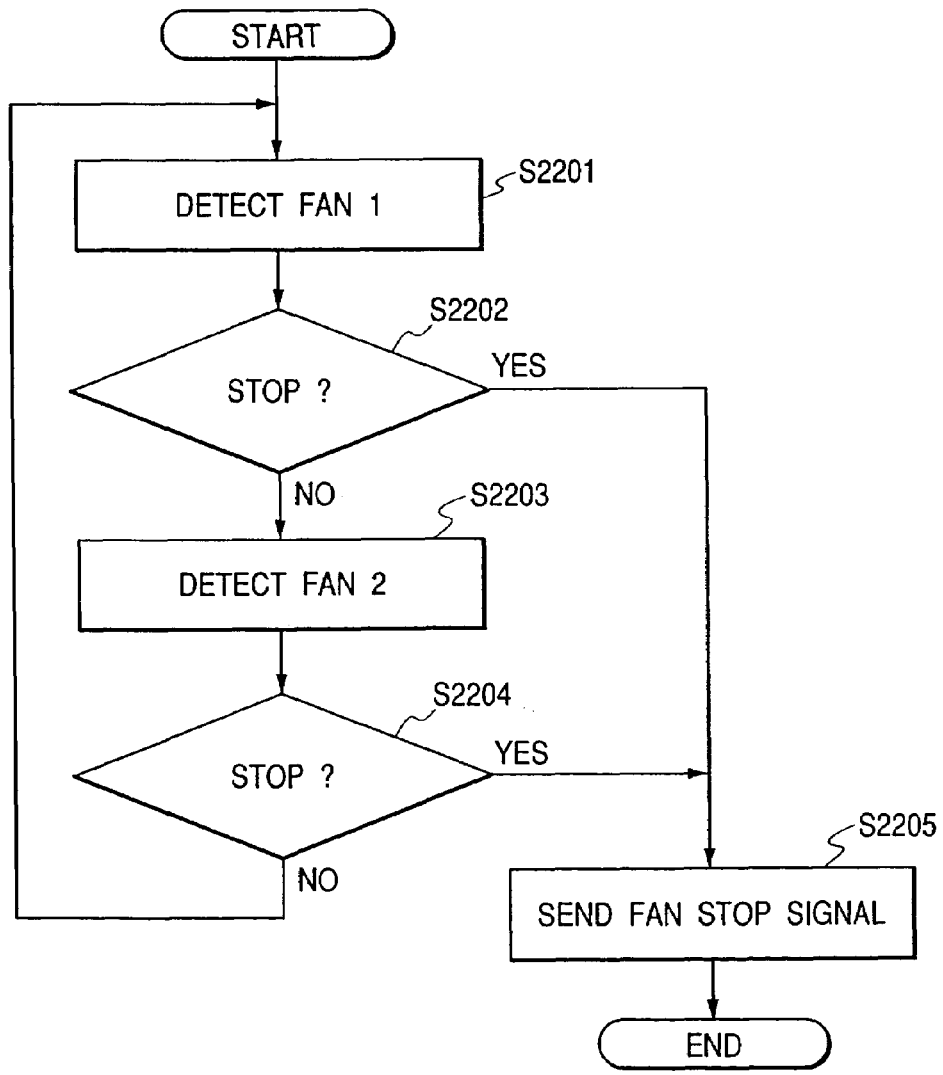
FIG. 22 is a flowchart showing the fan state detection processing performed by an operating state detector.

FIG. 22 is a flowchart showing the fan status detection processing performed by the operation status detection unit 1104.

The operation status detection unit 1104 detects the statuses of the CPU fan 1203 and of the air inlet fan in the air inlet port 704. When either fan is halted, the detection unit 1104 transmits a fan stopped signal to the pilot lamp 302 (steps S2201 to S2205). Upon receiving the fan stopped signal, the pilot lamp 302 turns red. In other words, when at least one of the fans is halted, the lamp 302 turns red.

The fan stopped signal may be used to represent various other statuses, and the lamp 302 may be changed to red, to green or to orange to indicate whether either or both fans are halted, which fan is halted, whether a fan has completely halted, or whether a fan has malfunctioned.

As a means of notifying a user, not only may the pilot lamp be used, but also an alarm sound may be generated, or an alarm message may be displayed on the operating panel 101. Further, the occurrence of an abnormality may be transmitted to a user or a manager by telephone, by an E-mail message or by a facsimile, if he or she is not near the apparatus.

Figure 23:
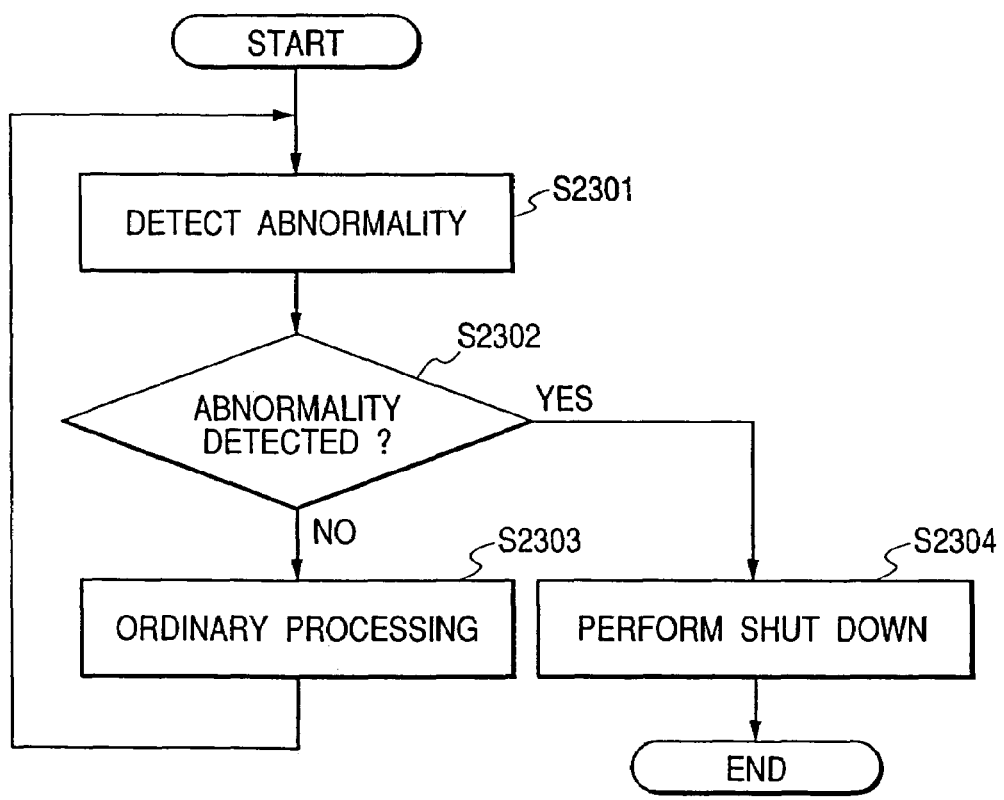
FIG. 23 is a flowchart showing the shutdown processing.

FIG. 23 is a flowchart showing the shutdown processing.

When an abnormality has occurred, for example, when the halting of the fan is detected by the operation status detection unit 1104, the shutdown processing is performed (steps S2301 to S2304).

In this embodiment, when a change in the status is detected and an expected operation may be performed, the shutdown processing is automatically performed and the power is turned off to prevent this. Not only may the shutdown processing be performed when the fan is halted, but also when there is an abnormal rise in the temperature in the apparatus, or when the abnormal operation of an external storage device is detected.

Figure 24:
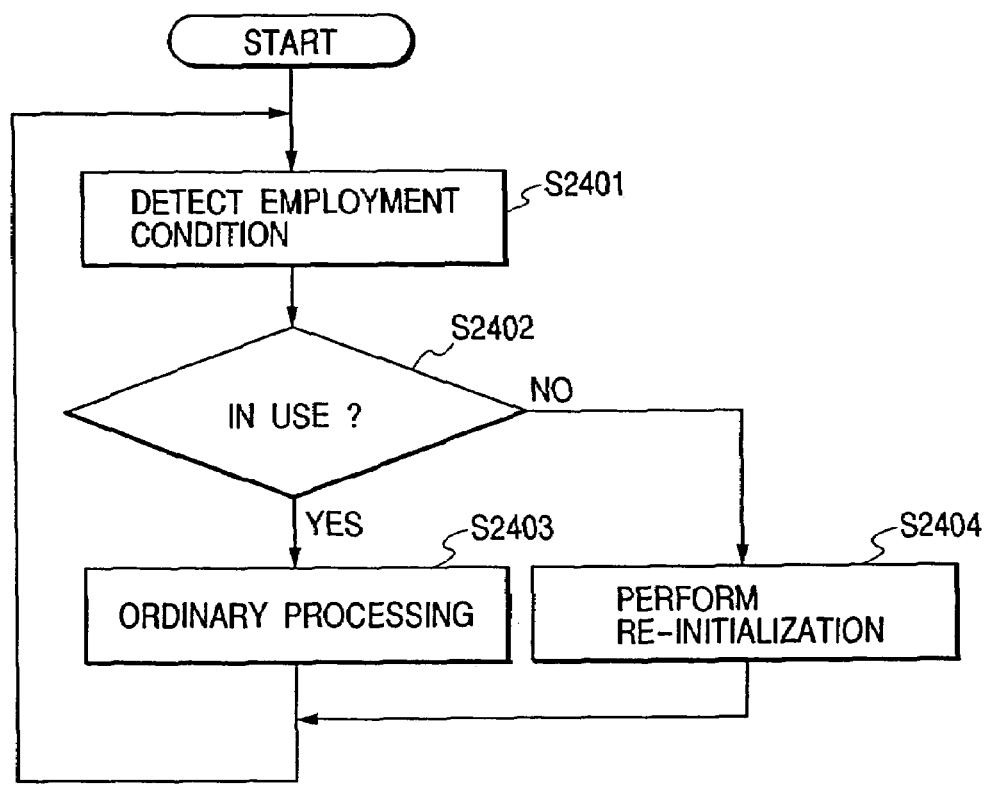
FIG. 24 is a flowchart showing the re-initialization processing.

FIG. 24 is a flowchart showing the re-initialization processing.

The employment condition is examined, and when an apparatus is not being employed, the initialization process is performed (steps S2401 to S2404).

While an apparatus is in continuous use, it may develop an unstable software or hardware condition (because of the user of a system module, or due to noise). In order to prevent such a phenomenon, when it is ascertained that a user is not employing an apparatus and that an initialization process can be performed with no problem, the initialization process (the halting of the process, or reactivation) is initiated.

Whether an apparatus is being employed may be detected when the screen display disappears (the user intentionally clears the screen, or no operations are performed for a specific period of time).

Figure 25:
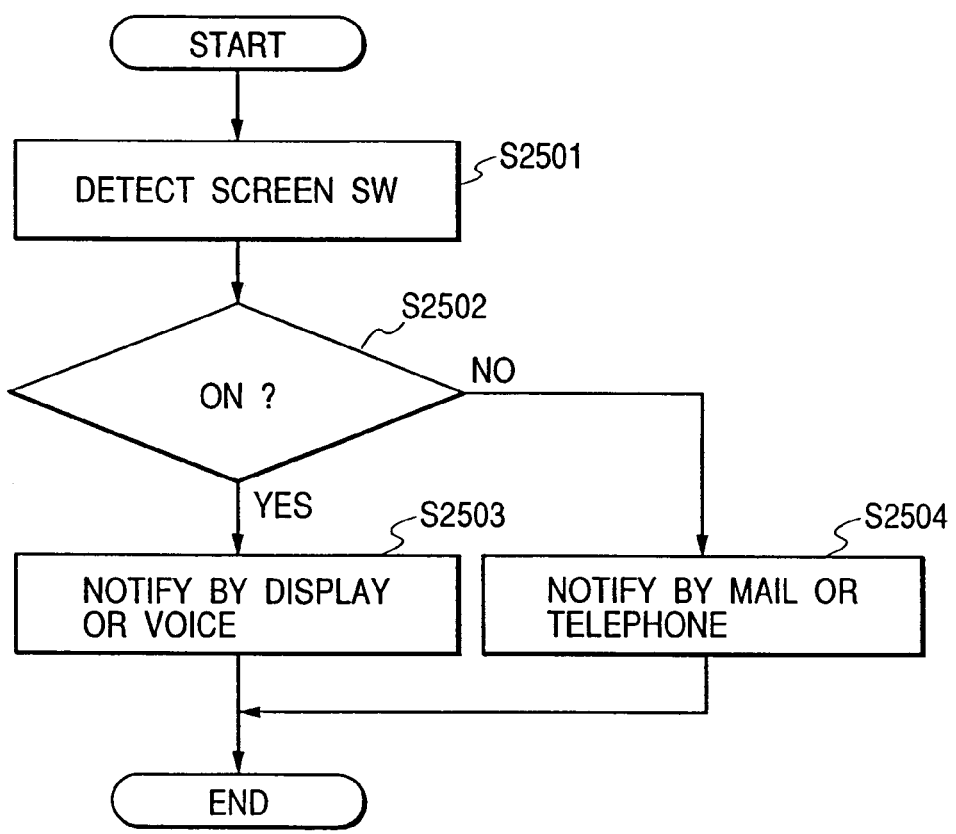
FIG. 25 is a flowchart showing the status determination processing.

FIG. 25 is a flowchart showing the condition determination processing.

The status of an apparatus is detected, and a process to be performed is varied in accordance with the status. Specifically, for issuing a notification, the status of the screen power switch is examined. When the screen is ON, it is assumed that a user is nearby, and the notification is issued by using the screen display or by voice. If the screen is OFF, it is assumed that a user is not nearby, and the notification is issued by mail or by telephone. The screen display may simply be employed when the screen switch is ON, and the other means may be employed when the screen switch is OFF.

Not only the ON/OFF state of the screen, but also the recovery from a screen saver may be employed to detect the presence of a nearby user. And the IrDA transmission/reception unit that will be described later while referring to FIGS. 26A to 26D through 28 may use infrared rays to determine whether a user is present in front of the apparatus.

FIGS. 26A to 26D are diagrams for explaining the authentication processing performed by the IrDA transmission/reception unit 301 on the operating panel 101.

Figure 26A:
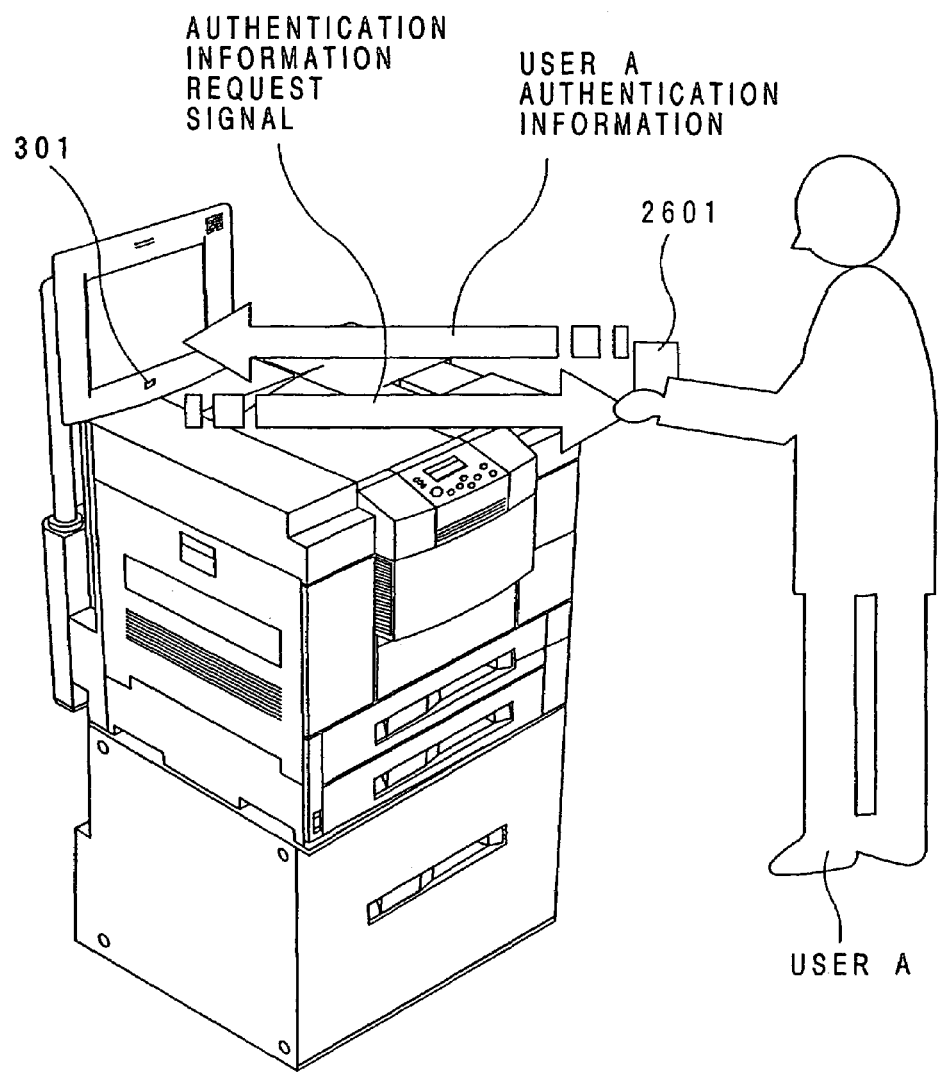
FIGS. 26A, 26B, 26C and 26D are diagrams for explaining the authentication processing performed by an IrDA transmission/reception unit on the operating panel.
Figure 26B:
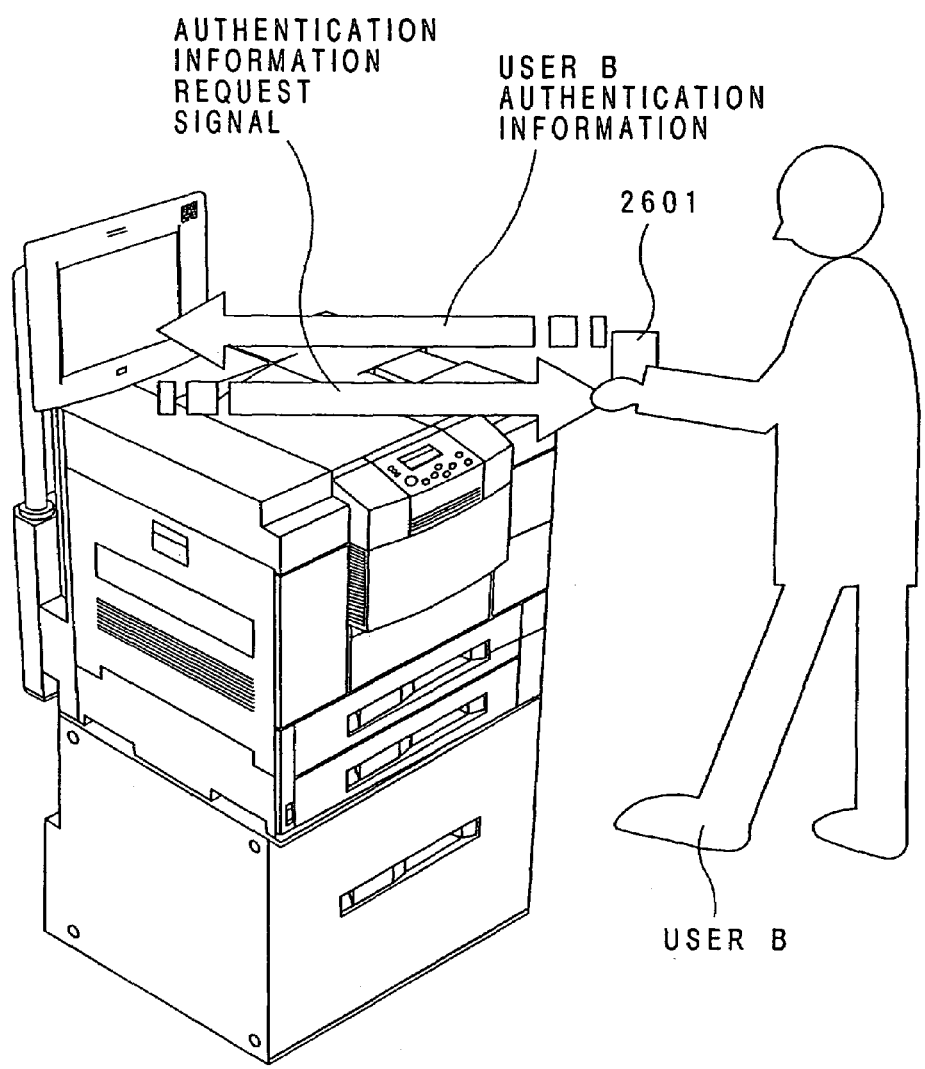

In FIG. 26A, upon receipt of an authentication information request signal from the IrDA transmission/reception unit 301 on the operating panel 101, a user A transmits authentication information for the user A using his or her remote controller 2601. In FIG. 26B as well as in FIG. 26A, a user B transmits authentication information for the user B using his or her remote controller 2601.

Figure 26C:
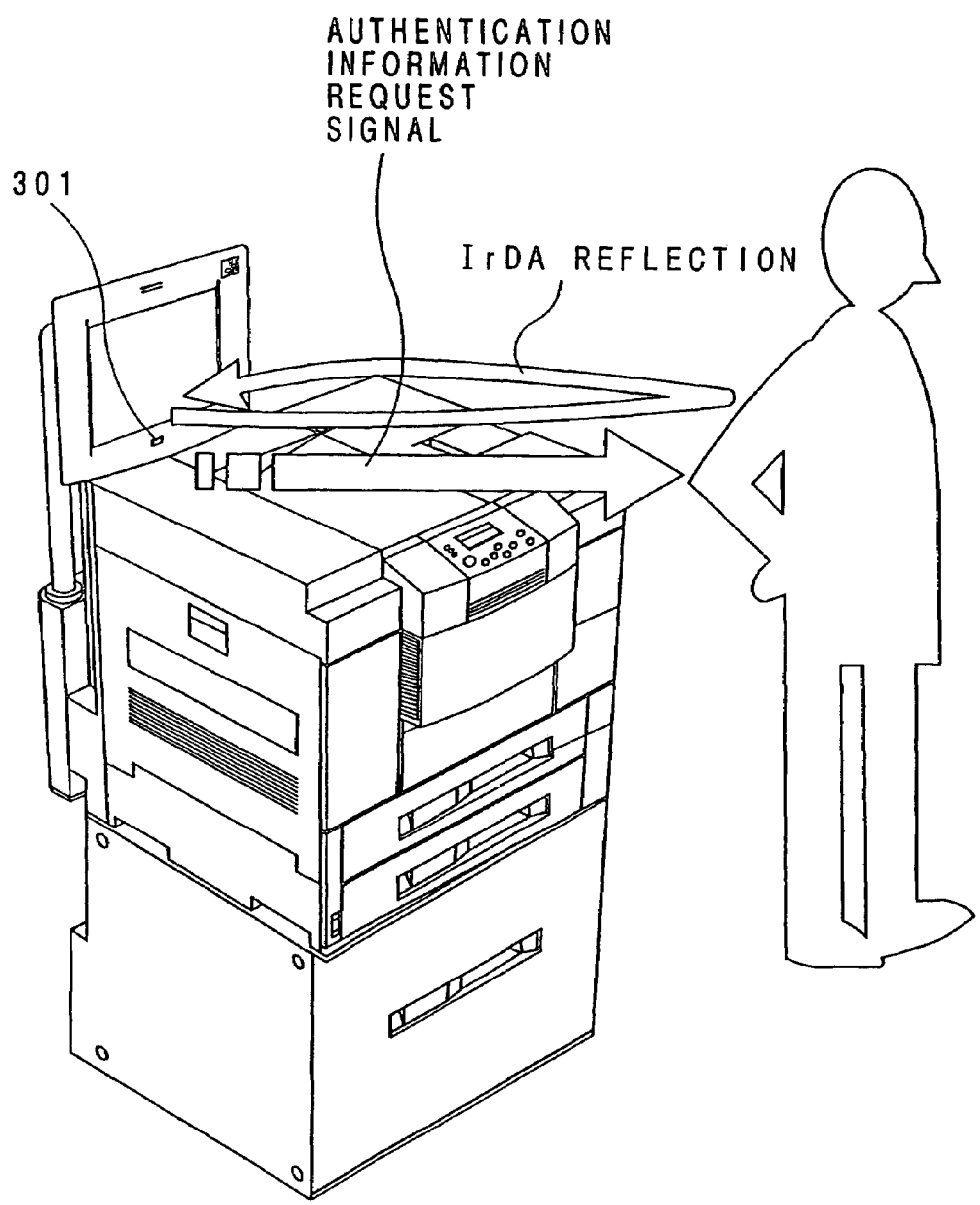
Figure 26D:
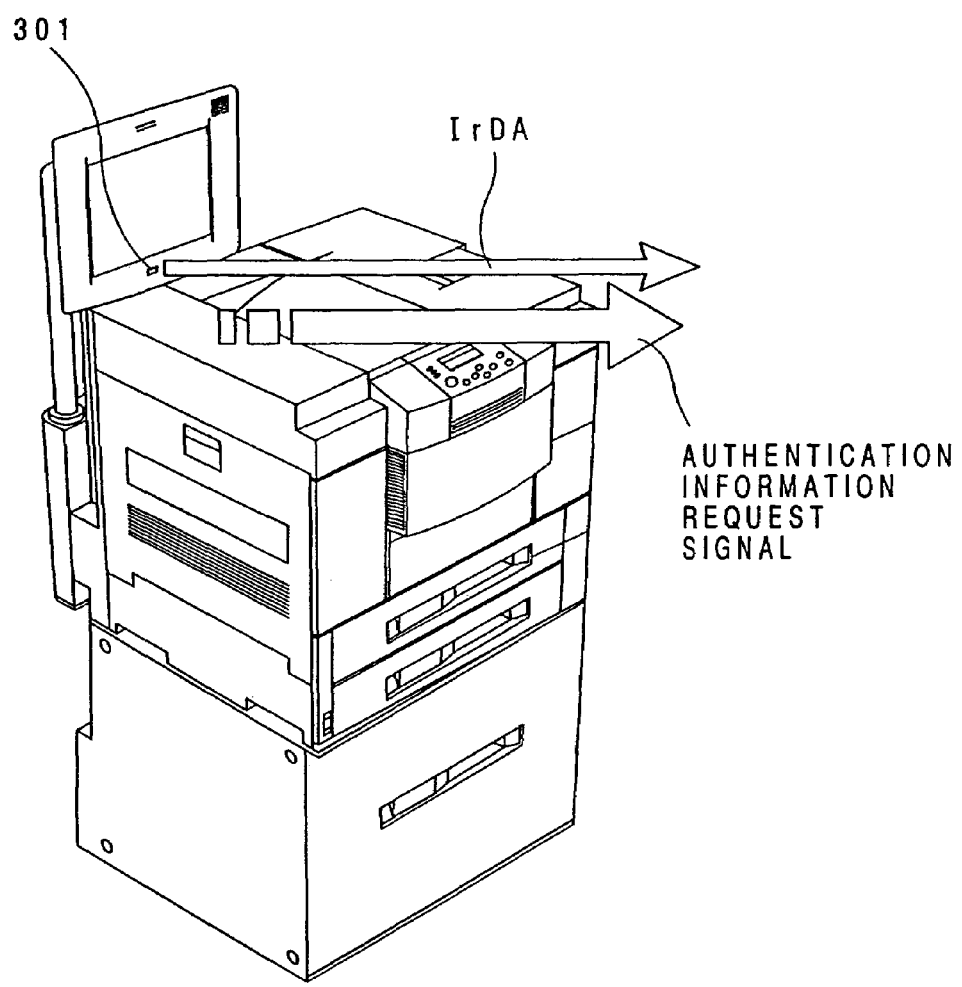

In FIG. 26C, since it is detected that an authentication information request signal has been reflected and received, it is determined that a user is present in front of the apparatus. In FIG. 26D, since there the authentication information request signal is not reflected, it is determined that no one is present in front of the apparatus.

Figure 27:
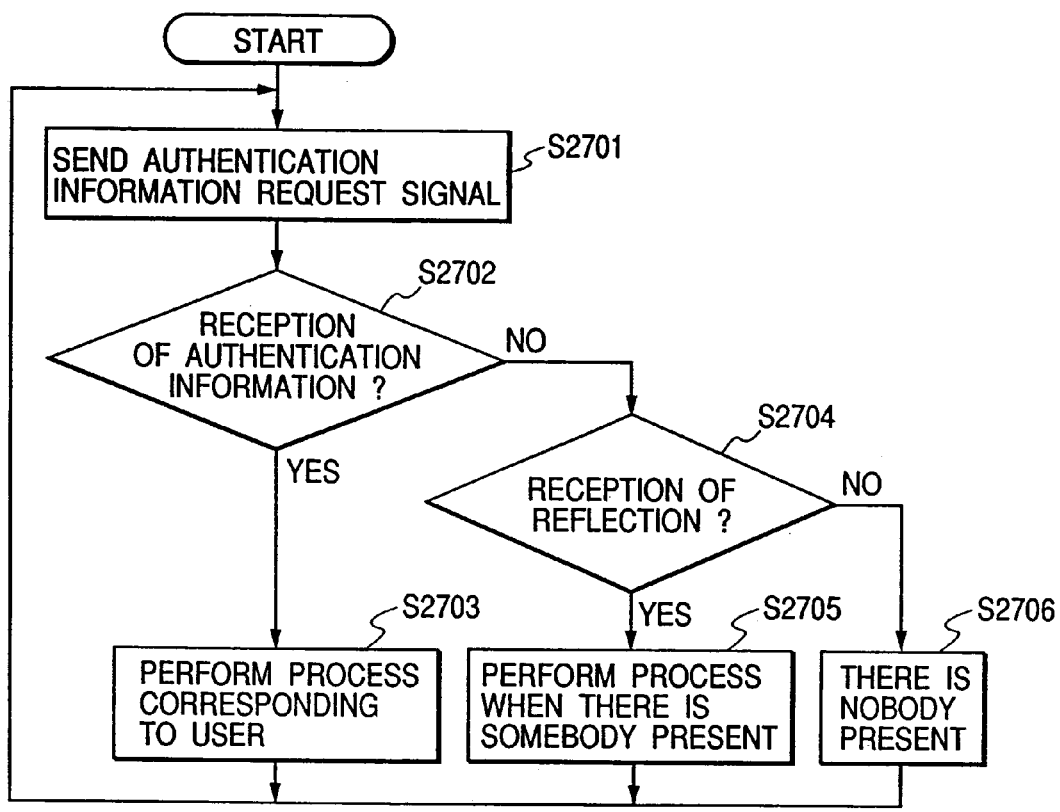
FIG. 27 is a flowchart showing the authentication processing performed by the IrDA transmission/reception unit on the operating panel.

FIG. 27 is a flowchart showing the authentication processing performed by the IrDA transmission/reception unit 301 of the operating unit 101.

The IrDA transmission/reception unit 301 constantly emits an authentication information request signal. When authentication information is received, a process corresponding to an authenticated user is performed (steps S2701 to S2703). For example, a menu is displayed in accordance with the level that is authorized for that operator, or a process customized by the operator is performed.

When authentication information is not received, the IrDA reflection is employed to determine the presence/absence of a user. When the presence of a user is detected, the process to be performed when the user is present is initiated. When the absence of a user is detected, the issuance of the authentication information request signal is repeated (steps S2704 to S2706). When the presence of a user is detected, for example, the screen is recovered from the screen saver, or a message permitting the use of the apparatus is displayed or is aurally released.

Figure 28:
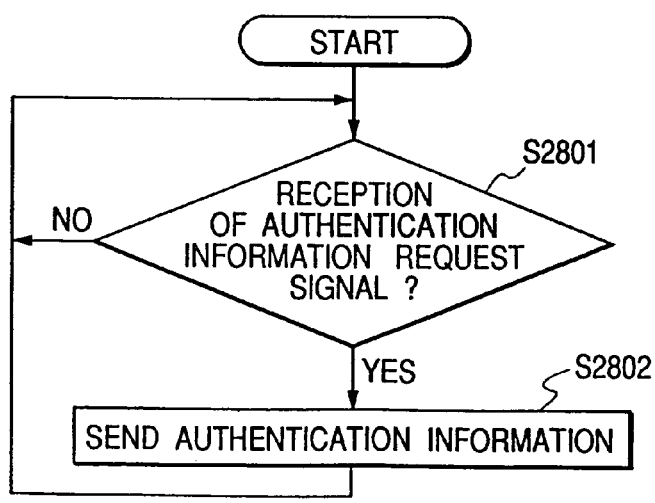
FIG. 28 is a flowchart showing the authentication information transmission processing by a remote controller employed by a user.

FIG. 28 is a flowchart showing the authentication information transmission processing performed by a user's remote controller.

A remote controller 2601, which possesses authentication information inherent to the user, receives an authentication information request signal from the IrDA transmission/reception unit 301, and in response transmits the authentication information inherent to the user. The operation performed by the remote controller 2601 can be effected via the IrDA transmission/reception unit 301.

An explanation will be given for a compound apparatus according to another embodiment of the present invention that has a printing function and a reading function. This apparatus serves as a printer and a copier, and also as a scanner and a facsimile machine.

Figure 29:
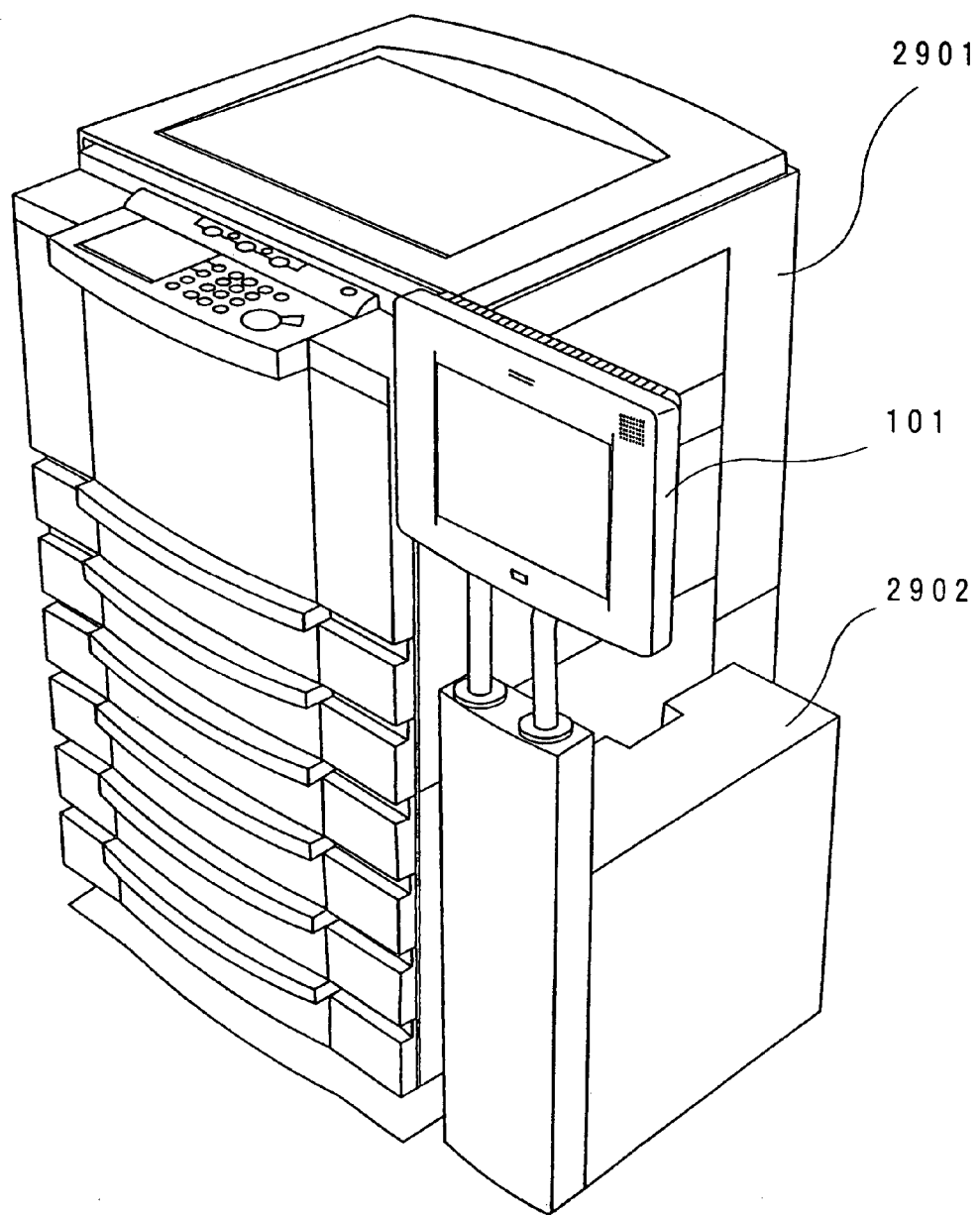
FIG. 29 is a diagram showing the external appearance of a compound apparatus according to another embodiment of the present invention.

FIG. 29 is a diagram illustrating the external appearance of a compound apparatus according to the embodiment of the present invention.

An operating panel 101 is fixed to an additional function unit 2902, which is installed in addition to a main body 2901 of a compound apparatus, and a control box 103 is built into the additional function unit 2902.

Figure 30:
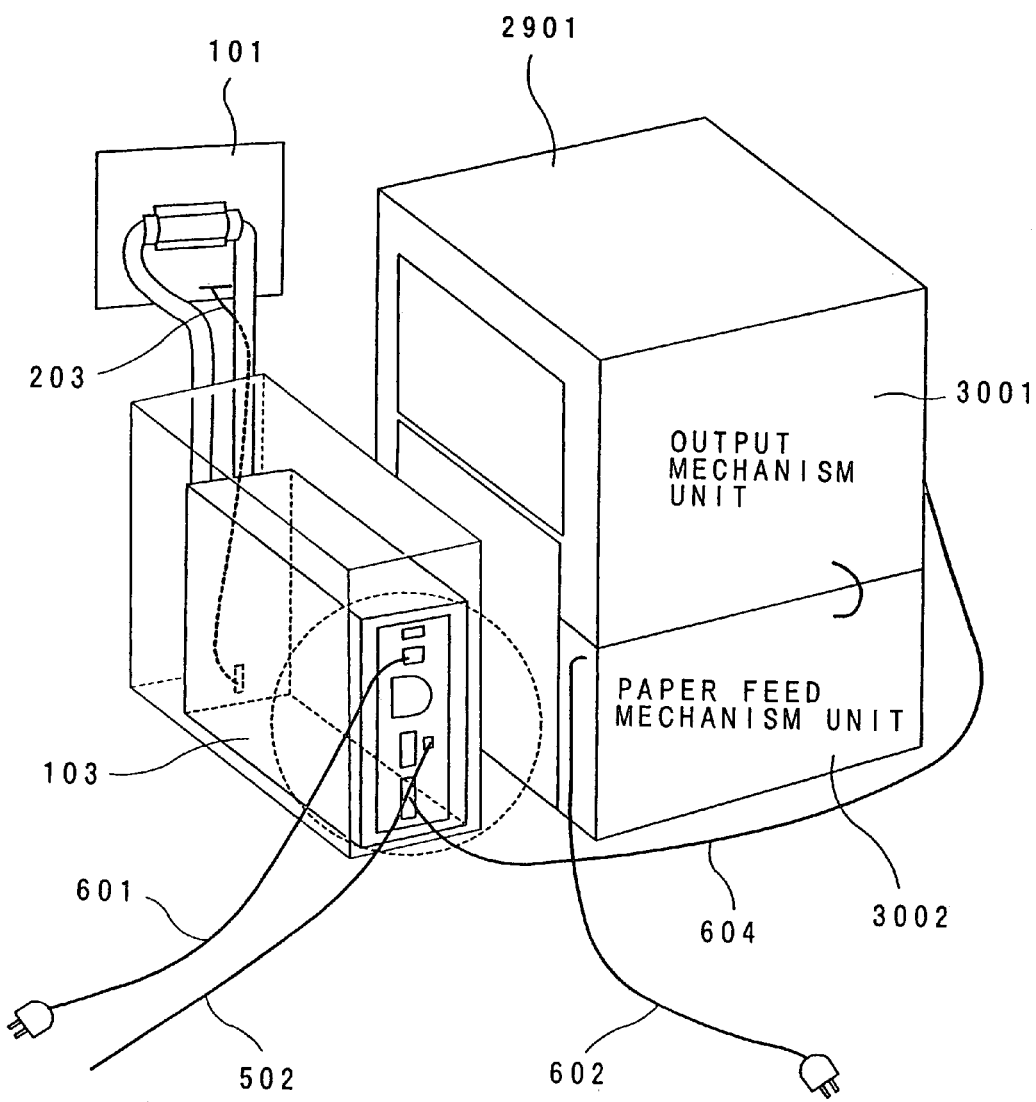
FIG. 30 is a rear view of the compound apparatus.
Figure 31A:
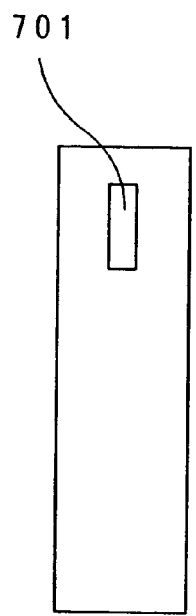
FIGS. 31A and 31B are a front view and a rear view of the control box.
Figure 31B:
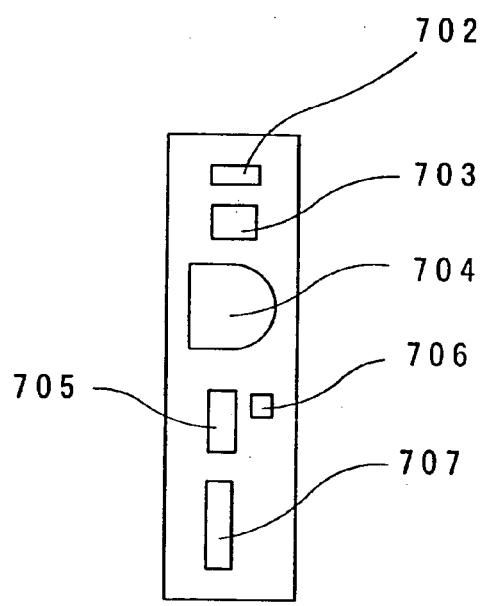

FIG. 30 is a rear view of the compound apparatus, and FIGS. 31A and 31B are respectively a front view and a rear view of the control box 103.

As is shown in FIG. 30, the rear face of the control box 103 shown in FIG. 31B is positioned opposite the rear face of the additional function unit 2902. This arrangement is the same as that explained while referring to FIG. 7B. The front of the control box 103 is connected, inside the added unit 2902, to one end of a multi-cable 203 that at its other end is connected to the operating panel 101.

Figure 32:
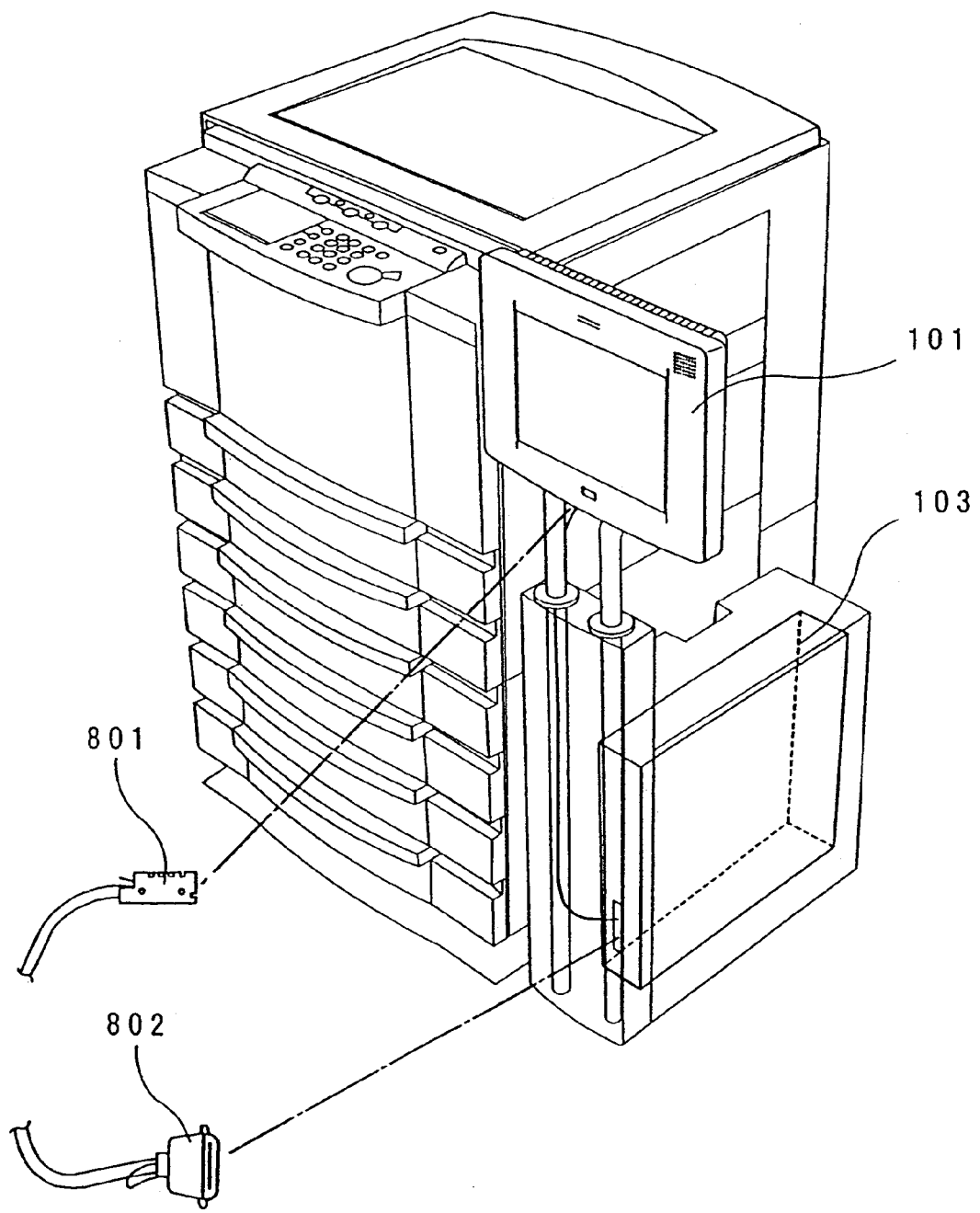
FIG. 32 is a diagram showing the connection of the operating panel and the control box.

FIG. 32 is a diagram illustrating the connection between the operating panel 101 and the control box 103.

The multi-cable 203 is detachably connected to the operating panel 101 by a connector 801, and is also detachably connected to the control box 103 by a connector 802.

Figure 33A:
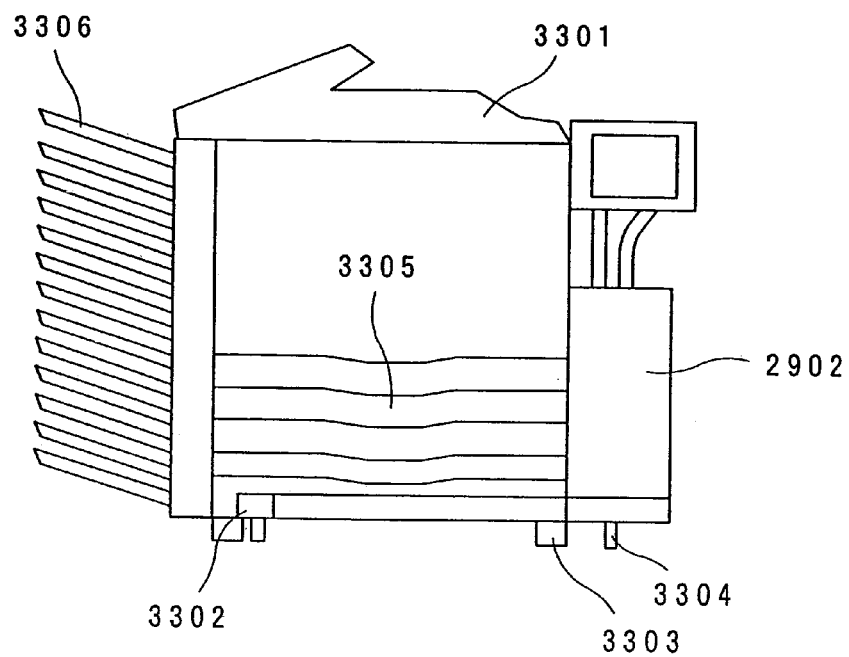
FIGS. 33A and 33B are diagrams for explaining the arrangement of the compound apparatus.
Figure 33B:
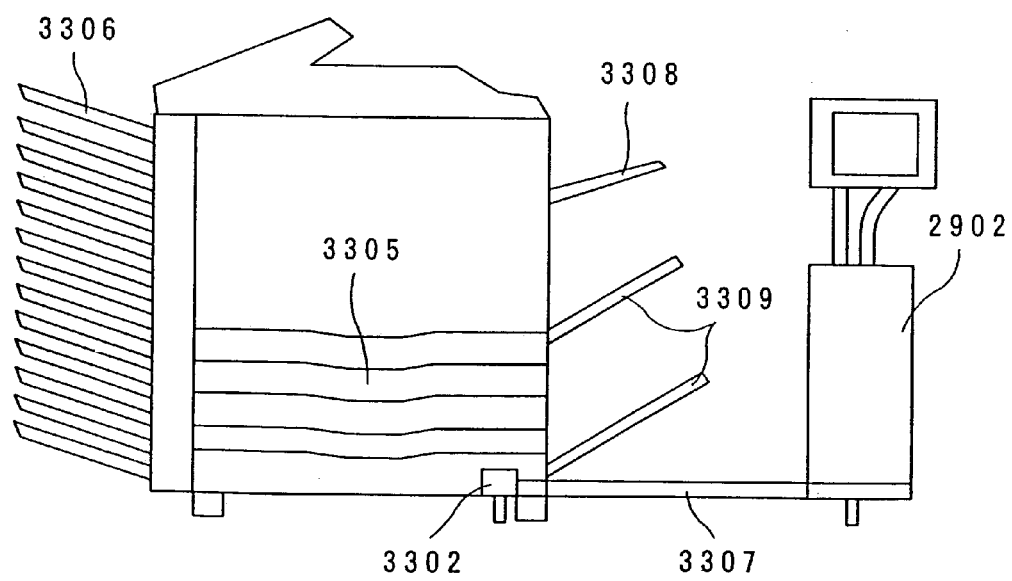

FIGS. 33A and 33B are diagrams for explaining the installation of the compound apparatus. In FIG. 33A is shown a normal installation and in FIG. 33B is shown the arrangement when the additional function unit is moved.

Figure 34:
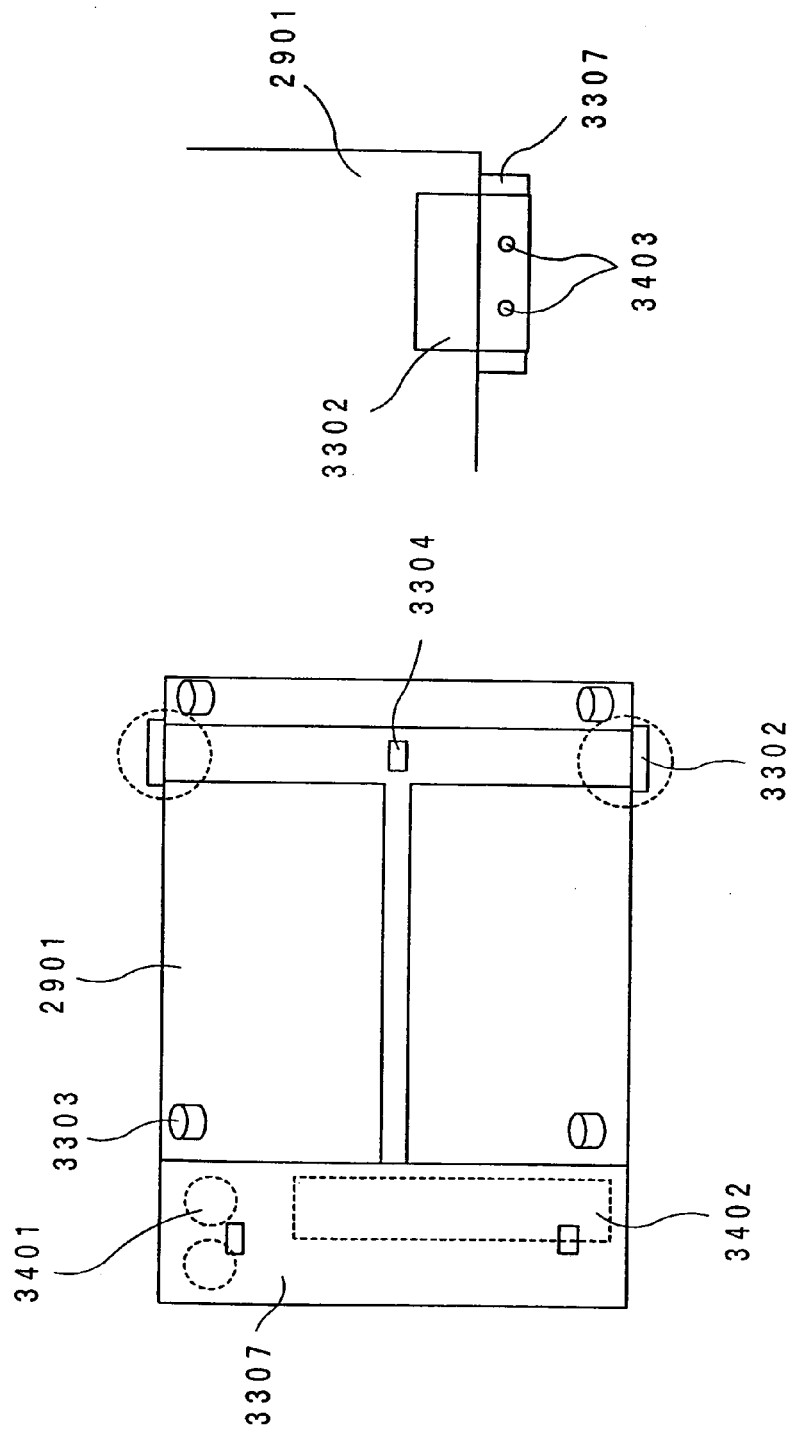
FIG. 34 is a diagram for explaining the arrangement at the bottom of the compound apparatus.

FIG. 34 is a diagram for explaining the bottom arrangement of the compound apparatus.

In FIGS. 33A and 33B, a document set on a feeder 3301, or a document that is placed directly on a document table under the feeder 3301, is read and copied on paper that is fed from a paper feeding tray 3305, and the copy is discharged to a discharge tray 3306. In order to position a document on the document table, the feeder 3301 is pivoted toward the rear of the apparatus at the rear of the feeder 3301.

Unlike in the embodiment explained while referring to FIG. 1, the operating panel 101 in this embodiment is not installed above the apparatus, but is instead installed beside the apparatus. But since were the operating panel 101 to be located on the side adjacent to the paper discharge tray 3306, the frequently performed operation of extracting copy from the discharge tray 3306 would be interfered with, the operating panel 101 is installed on the opposite side.

However, since on that side there are a manual tray 3308 that is used for feeding paper manually and a maintenance cover 3309 that must be opened when a paper jam is removed, even though it is not often necessary, the additional function unit 2902 must be moved when these facilities are accessed. Therefore, casters 3304 are provided on the bottom of the additional function unit 2902 so that it can be slid aside, and as a result, when maintenance is performed on the main body 2901 of the compound apparatus, adequate working space can be acquired, and the manual feeding of paper and the removal of paper jams are not interfered with.

To enable the movement of the additional function unit 2902, it is mounted on a bar 3307 to which the casters 3304 attached. The bar 3307 is H-shaped, having two parallel plate members that are connected at their centers by a third plate member. The structure of the bar 3307 is not limited to this example, and may consist of only a single plate, rather than one having three members. The bar 3307 is passed through and under the main body 2901 of the compound apparatus, and the additional function unit 2902 is fixed to one of the parallel portions while guides 3302 are attached at either end of the other parallel portion. When the bar 3307 is moved while the guides 3302 are in contact with the front and rear faces of the apparatus, the additional function unit 2902 can be moved toward the right of the apparatus. The casters 3304 are attached to the bar 3307 at three places (two below the additional function unit 2902, and one centered between the guides 3302).

Therefore, the additional function unit 2902 can be provided for the compound apparatus merely by inserting the bar 3367 on which the casters 3304 are mounted into the main body 2901, without adding a member to the main body 2901 or having to drastically alter it. The bar 3307 is inserted diagonally under the main body 2901 of the compound apparatus without moving it, and the members of the bar 3307 that are parallel to the bottom of the additional function unit 2902 are placed between the legs of the main body 2901. Then, the guides 3302 are attached to the bar 3307 to secure the additional function unit 2902.

Furthermore, in order to increase and ensure the stability of the additional function unit 2902 when it is moved, the transverse width of the control box cover of the additional function unit 2902 is set so that it is larger than is the control box 103.

Figure 35A:
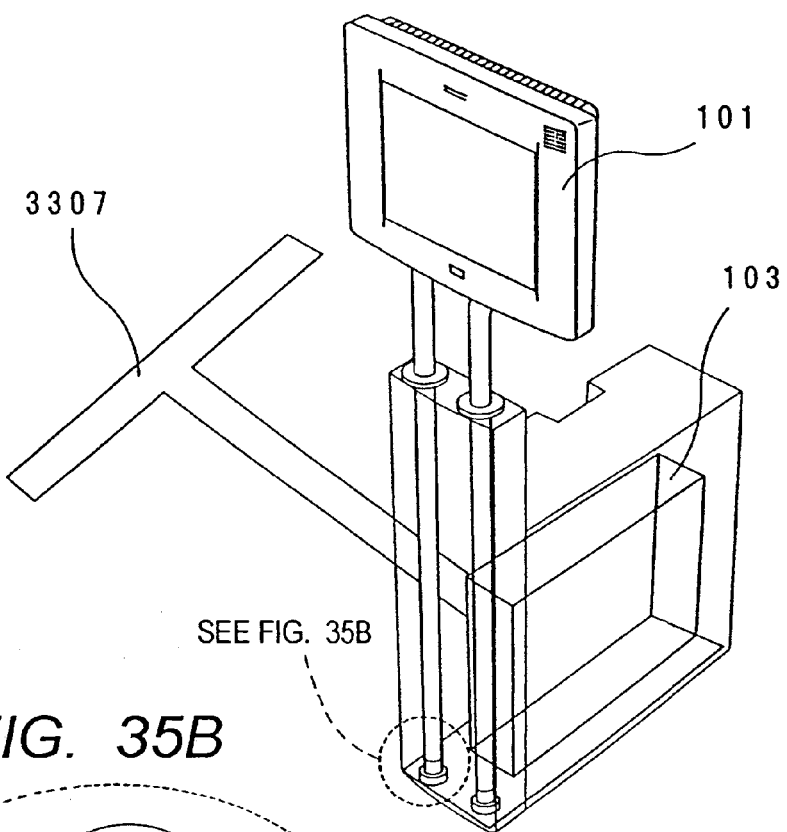
FIG. 35 which includes FIGS. 35A to 35B, provides diagrammatical illustrations for use in explaining a method for fixing strut pipes.
Figure 35B:
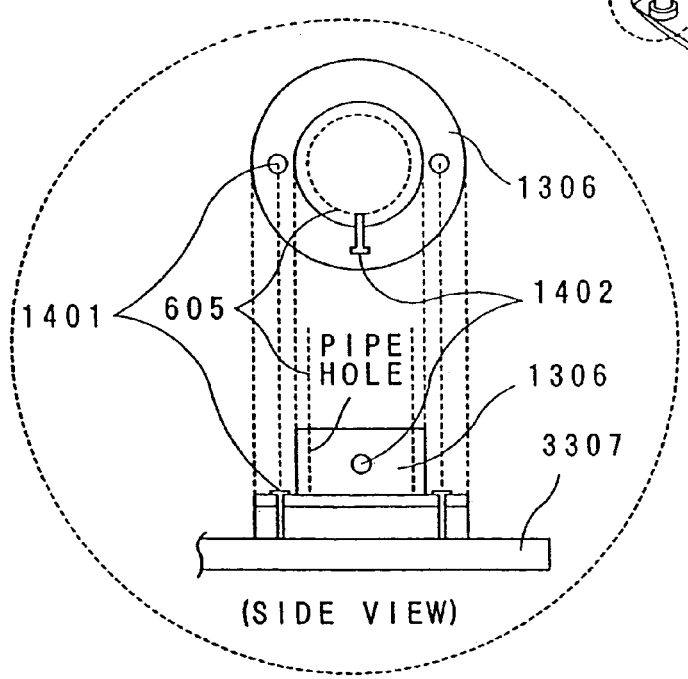

FIG. 35 provides diagrammatical illustrations for use in explaining a method for fixing strut pipes 605.

The operating panel 101 is supported by two strut pipes 605, each of which is attached to the bar 3307 as follows. First, a pipe block 1306 is fixed to a plate 606 at two places using pipe block fixing screws 1401. The strut pipe 605 is inserted into the fixed pipe block 1306, and is secured by a pipe fixing screw 1402 that is inserted through a pipe hole that is formed on the side of the pipe block 1306.

Figure 36:
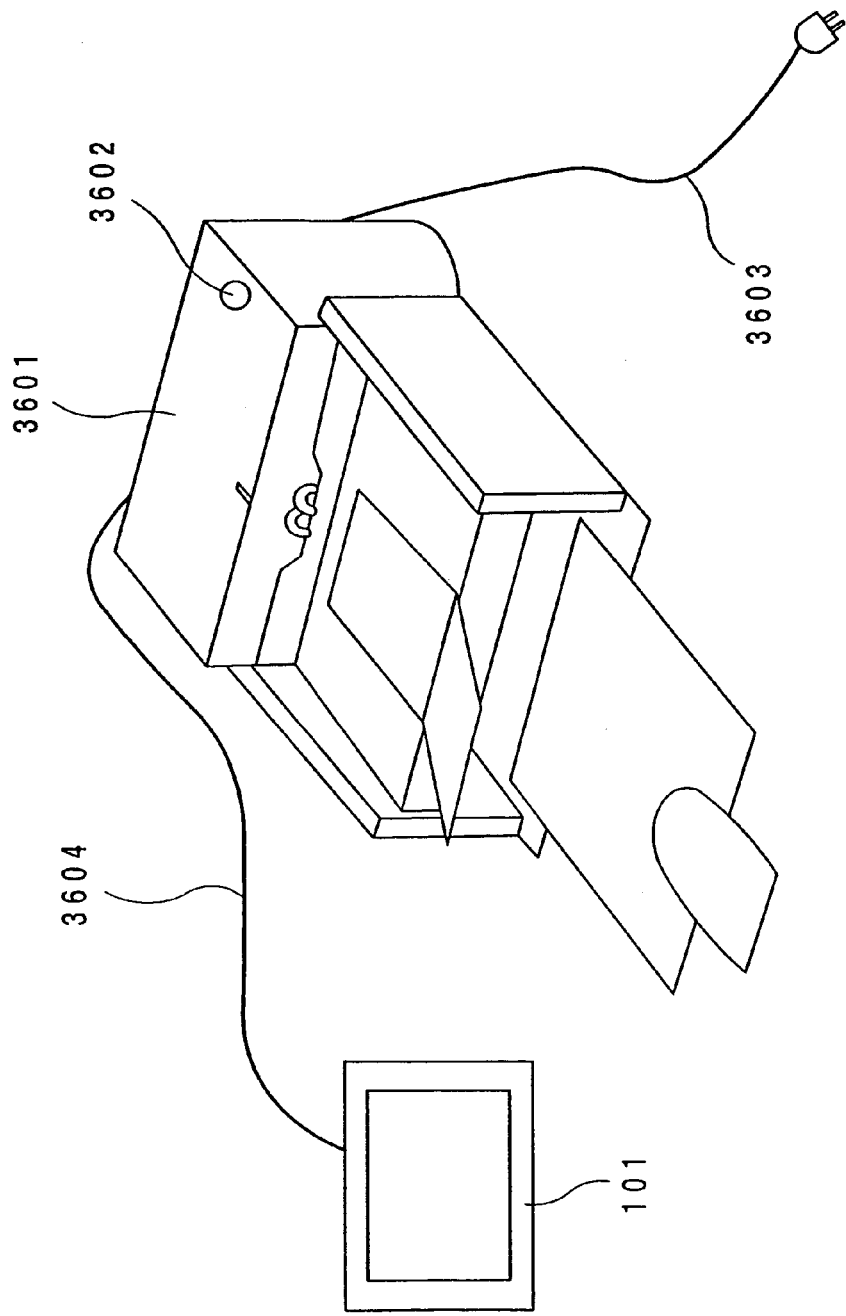
FIG. 36 is a diagram showing the external appearance of a scanner according to an additional embodiment of the present invention.

FIG. 36 is a diagram showing the external appearance of a scanner according to an additional embodiment of the present invention.

In the scanner in this embodiment, for additional functions, one part or all of the functions provided by the above described control box 103 are installed in the scanner main body 3604, which is connected to an operating panel 101 by a cable 3604 that is connected to the rear face of the scanner main body 3604. For use, the operating panel 101 is placed directly on a desk.

In this embodiment, the functions explained while referring to FIGS. 20 to 28 can be implemented. Further, the control box 103 may be placed at the rear or beside the apparatus, as in the other embodiments.

To implement the functions described while referring to FIGS. 20 to 28, a memory medium on which is stored software program code for implementing these functions can be supplied for an apparatus or for a system, and the computer in the apparatus or in the system can read the program code from the memory medium.

In addition, the scope of the present invention includes not only a case where the functions in the embodiment can be performed when program code is read and executed by the computer, but also a case where, in accordance with an instruction contained in the program code, an OS running on the computer, etc., can perform the processing required to accomplish those functions that are included in the above embodiment.

The memory medium on which such program code is recorded constitutes the present invention.

As is described above, according to the embodiments, another function can be implemented in addition to the original functions of an apparatus.

Further, according to the embodiments, the connection of a plurality of devices can be facilitated.

Furthermore, according to the embodiments, the destruction of an operation unit and upsetting of an apparatus can be prevented.

Although the present invention has been described in its preferred form with a certain degree of particularity, many apparently widely different embodiments of the invention can be devised without departing from the spirit and the scope thereof. It is to be understood that the invention is not limited to the specific embodiments described herein, except as is defined in the appended claims.

What is claimed is:

1. An information processing apparatus comprising:
a main body for performing that information processing that constitutes the original function of said apparatus; and
an additional unit for performing other information processing in addition to that which constitutes said original function,
wherein said additional unit is fixed on an area of an upper side of a plate and another area of the upper side of said plate is laid beneath said main body so as to fix a position of said plate to said main body by the weight of said main body, thereby said additional unit is installed at a fixed position relative to said main body without fixing said additional unit or said plate to said main body.

2. An information processing apparatus according to claim 1, further comprising:
connection means for electrically connecting said main body and said additional unit.

3. An information processing apparatus according to claim 2, wherein said connection means detachably connects said additional processing means and said main body of said apparatus.

4. An information processing apparatus according to claim 1, wherein said fixed position is at the rear of said main body.

5. An information processing apparatus according to claim 1, wherein said plate is sandwiched between said main body and a different device.

6. An information processing apparatus according to claim 5, wherein said different device is a paper feeding device for feeding paper to said main body of said apparatus.

7. An information processing apparatus according to claim 6, wherein said plate member is formed in a shape that corresponds to that of a connection member for said paper feeding device and said main body.

8. An information processing apparatus according to claim 6, wherein a rod member is fixed at one end to a joint between said paper feeding device and said main body, and is fixed at the other end to said plate member.

9. An information processing apparatus according to claim 1, wherein said additional processing means is movable relative to said main body.

10. An information processing apparatus according to claim 9, wherein said additional processing means is movable so that an opening/closing mechanism attached to said main body can be freely opened and closed.

11. An information processing apparatus according to claim 10, wherein said information processing means is means for executing printing, and said opening/closing mechanism is an access door for maintenance or for a manual feed tray.

12. An information processing apparatus according to claim 9, wherein said additional processing unit is rendered movable by the attachment of wheels.

13. An information processing apparatus according to claim 12, wherein said additional function means is fixed to a plate member having said wheels, and said plate member is positioned by being passed though and under the bottom of said main body.

14. An information processing apparatus according to claim 12, wherein guide members are additionally provided for said plate member, so that said plate member can move along said main body.

15. An information processing apparatus according to claim 1, wherein the width of a case in which said additional processing means is stored is larger in the direction of movement than is the width of a circuit for said additional processing means.

16. An information processing apparatus according to claim 1, wherein said information processing means and said additional processing means are independently operable.

17. An information processing apparatus according to claim 16, wherein said additional processing means can be operated even when said information processing means has been disabled.

18. An information processing apparatus according to claim 16, wherein said information processing means can be operated even when said additional processing means has been disabled.

19. An information processing apparatus according to claim 1, wherein said information processing means is means for reading information or for executing printing.

20. An information processing apparatus according to claim 1, further comprising input means used by a user to enter information into said additional processing means.

21. An information processing apparatus according to claim 20, wherein said input means includes at least one of a microphone, a touch panel, a keyboard, and a mouse.

22. An information processing apparatus according to claim 1, further comprising storage means for storing information required for a process that is performed by said additional processing means.

23. An information processing apparatus according to claim 22, wherein said storage means includes at least one of a hard disk, a floppy disk, a CD, and a storage device of another information processing apparatus that is connected across a network.

24. An information processing apparatus according to claim 1, further comprising external status acquisition means for obtaining from an external status information that is required for a process performed by said additional processing means.

25. An information processing apparatus according to claim 24, wherein said external status acquisition means includes at least either a sensor for detecting an external status or a network for obtaining an external status.

26. An information processing apparatus according to claim 1, further comprising internal status acquisition means for obtaining, from an internal status of said information processing means, information that is required for a process performed by said additional processing means.

27. An information processing apparatus according to claim 26, wherein said internal status acquisition means acquires said internal status at least through either a centro-cable for directly connecting said printing means to said additional processing means, or a network cable for indirectly connecting said printing means to said additional processing means.

28. An information processing apparatus according to claim 1, further comprising internal status acquisition means, for said additional processing means, for obtaining, from an internal status of said additional processing means, information that is required for a process performed by said additional processing means.

29. An information processing apparatus according to claim 28, wherein said internal status acquisition means, for said additional processing means, includes at least either cooling fan abnormality notification means, or memory use status abnormality notification means.

30. An information processing apparatus according to claim 1, further comprising notification means for issuing a notification in accordance with said process performed by said additional processing means.

31. An information processing apparatus according to claim 30, wherein said notification means includes at least one of a display means using a display screen, a voice output means using a loudspeaker, a warning means using an LED, and a communication means using a modem, infrared rays or a network.

32. An information processing apparatus according to claim 1, further comprising output means for outputting the results of processing performed by said additional processing means.

33. An information processing apparatus according to claim 32, wherein said output means includes at least one of a display means using a display screen, a voice output means using a loudspeaker, a warning means using an LED, and a communication means using a modem, infrared rays or a network.

34. An information processing apparatus according to claim 1, further comprising communication means for at least receiving information required by said additional processing means, or transmitting information in accordance with a process performed by said additional processing means.

35. An information processing apparatus according to claim 34, wherein said communication means employs at least one of a modem, infrared rays, and a network.

36. An information processing apparatus according to claim 1, wherein said additional processing means performs a process in accordance with process instruction command information that includes a process type.

* * * * *